(12) United States Patent
Rogers

(10) Patent No.: US 9,928,643 B2
(45) Date of Patent: Mar. 27, 2018

(54) HIERARCHICAL CONTINUOUS LEVEL OF DETAIL FOR THREE-DIMENSIONAL MESHES

(71) Applicant: Douglas Rogers, Gilroy, CA (US)

(72) Inventor: Douglas Rogers, Gilroy, CA (US)

(*) Notice: Subject to any disclaimer, the term of this patent is extended or adjusted under 35 U.S.C. 154(b) by 224 days.

(21) Appl. No.: 14/988,480

(22) Filed: Jan. 5, 2016

(65) Prior Publication Data

US 2017/0091992 A1    Mar. 30, 2017

Related U.S. Application Data

(60) Provisional application No. 62/233,861, filed on Sep. 28, 2015.

(51) Int. Cl.
*G06T 17/00* (2006.01)
*G06T 17/20* (2006.01)

(52) U.S. Cl.
CPC ............ *G06T 17/005* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 6,348,921 B1* | 2/2002 | Zhao | G06T 17/20 345/428 |
| 2006/0132488 A1* | 6/2006 | Lim | G06T 17/05 345/428 |
| 2008/0238919 A1* | 10/2008 | Pack | G06T 15/04 345/420 |
| 2008/0278486 A1* | 11/2008 | Royan | G06T 15/40 345/420 |
| 2010/0277476 A1* | 11/2010 | Johansson | G06T 17/20 345/423 |
| 2010/0283787 A1* | 11/2010 | Hamedi | G06T 17/005 345/473 |
| 2012/0117124 A1* | 5/2012 | Bruaset | G06T 17/005 707/797 |
| 2013/0335406 A1* | 12/2013 | Tabellion | G06T 15/506 345/419 |
| 2015/0189130 A1* | 7/2015 | Milosevski | H04N 5/23222 386/224 |

* cited by examiner

*Primary Examiner* — James A Thompson
(74) *Attorney, Agent, or Firm* — Russell T. Manning; Marsh Fischmann & Breyfogle LLP

(57) ABSTRACT

Embodiments use hierarchical continuous level of detail (H-CLOD) trees with inherited splitting plane partitioning to reduce visual artifacts in renderings. For example, a three-dimensional mesh can be iteratively split, according to iteratively defined splitting planes, until sub-meshes are smaller than a predetermined bucket size. Each splitting can define a hierarchical level of a tree, so that the original mesh is a root node, each split sub-mesh is a child node, and the smallest meshes are leaf nodes. An H-CLOD tree can be generated by simplifying and combining each group of sibling node sub-meshes bottom-up into a simplified parent mesh accounting for inherited splitting planes, so that the tree has a most simplified mesh as its root node and a most un-simplified mesh formed by a combination of its leaf nodes. At render time, traversing the H-CLOD tree can produce a desired level of detail from the pre-computed nodes.

20 Claims, 17 Drawing Sheets

HIERARCHICAL CONTINUOUS LEVEL OF DETAIL FOR THREE-DIMENSIONAL MESHES

FIELD

Embodiments relate generally to graphics processing, and, more particularly, to generating and exploiting hierarchical levels of mesh detail that utilize inherited partitioning split planes to provide a continuous level of detail in arbitrary and other types of meshes.

BACKGROUND

In three-dimensional computer graphics environments, objects in a scene are typically modeled as three-dimensional meshes made up of primitives (e.g., triangles or other polygons resulting from decomposing of a surface by tessellation, or the like). The polygons can define faces of surfaces, and those surfaces can represent objects that are relatively simple, such as a flat wall; or objects that are relatively complex, such as a human or animal character. Surface maps (e.g., textures and/or skins) can be applied to the faces to produce a desired surface appearance of the object (e.g., color, texture, reflectivity, opacity, etc.). A three-dimensional scene can then be displayed by rendering the faces and their associated surface maps in context of the objects' relative to one or more virtual cameras, etc.

Rendering and displaying a three-dimensional object can often involve large numbers of computations to determine locations of, and complex interactions with, the coordinate points (e.g., polygon vertices) of the primitives making up an object's surface. As the surfaces representing objects get larger and/or more complex, they tend to include increasing numbers of primitives defined by increasing numbers of coordinate points. Further, rendered scenes are becoming more complex, for example, with larger numbers of complex objects in each scene, which can further add substantially to the number of primitives involved in rendering and displaying the scene. As such, extremely large amounts of computing resources can be involved in rendering, particularly in real-time three-dimensional environments, such as video games, virtual immersive environments, etc.

Various techniques are used to reduce the complexity of a scene, thereby reducing the computational intensity involved in rendering and displaying the scene. Some techniques seek to determine where mesh complexity can be reduced without causing an undesirable amount of degradation in visual experience. For example, simplified meshes (i.e., meshes with appreciably fewer coordinate points) can be used to render objects that are further in the background of the scene, under an assumption that it will be less noticeable if those objects are rendered with less three-dimensional surface detail. According to some such techniques, when rendering a scene, mesh complexities are determined with respect to a virtual camera position, and appropriately complex meshes can be generated or selected, accordingly. However, changing of mesh complexities between renderings (e.g., between frames), can often manifest certain visual artifacts, such as popping. Such techniques are often based solely on distance from the mesh to a virtual camera.

BRIEF SUMMARY

Among other things, systems and methods are described herein for using hierarchical continuous level of detail (H-CLOD) trees with inherited splitting plane partitioning to reduce visual artifacts in continuous level of detail renderings. Embodiments operate in context of three-dimensional meshes that model objects as coordinate points connected by edges (line segments) to define faces. A mesh can be iteratively split by, in each iteration, defining a splitting plane that partitions the mesh into two or more sub-meshes, until each sub-mesh is smaller than a predetermined mesh size (referred to herein as "bucket size"). The splitting can be assigned to a hierarchical tree, such that the original mesh is the root node, each sub-mesh is a child node to the mesh from which it was generated by splitting. The smallest meshes are leaf nodes, which can each contain no more than the bucket size number of faces. An H-CLOD tree can be generated by simplifying and combining each group of sibling node sub-meshes, by a bottom-up traversal of the tree, into a simplified parent mesh accounting for inherited splitting planes. The simplified parent meshes can replace the previously un-simplified parent meshes in the tree, so that the resulting H-CLOD tree has a most simplified mesh as its root node and a most un-simplified mesh formed by a combination of its leaf nodes.

At render time, embodiments can traverse the H-CLOD tree to produce a desired level of detail from the pre-computed nodes of the tree. For example, an object can be rendered in each frame by rendering all active nodes of the tree representing the object. These active nodes are referred to herein as the "active front." As a virtual camera position changes, the active front nodes can be analyzed to determine whether they still provide a desired level of detail. If not, each active front node can be replaced by its parent or its children, depending on whether less or more detail is desired, respectively. The H-CLOD tree can reduce undesirable visual artifacts by providing a number of features, including, for example, by allowing different portions of the mesh to be in different branches of the tree that can be traversed to different levels, by simplifying the mesh using a bottom-up traversal that accounts for inherited splitting planes, etc. Further, some implementations can include features, such as backface culling of nodes according to orientation of faces relative to camera position, adaptation of H-CLOD tree functionality to skeletal (e.g., skinned) types of meshes, etc.

According to one set of embodiments, a method is provided for generating a hierarchical continuous level of detail (H-CLOD) tree data structure for three-dimensional (3D) model rendering. The method includes: storing a raw 3D mesh (e.g., an arbitrary mesh) of the 3D model to a root node of an unsimplified tree data structure; and iteratively adding nodes to the unsimplified tree data structure from the raw 3D mesh by, for each lowest-level node of the tree data structure, until each lowest-level node has an associated mesh that is smaller than a predetermined bucket size: splitting the candidate mesh according to a candidate splitting plane determined for the lowest-level node to generate at least two child meshes; storing the candidate splitting plane to the set of local splitting planes; and storing each of the at least two child meshes to a respective child node added to the lowest-level node, such that each child node becomes a lowest-level node in a respective branch of the unsimplified tree data structure. The method further includes iteratively generating an H-CLOD tree data structure from the unsimplified tree data structure by, for each non-leaf child node of the unsimplified tree data structure: combining all meshes stored by children nodes of the non-leaf child node to form a pre-simplified mesh; and computing a simplified mesh from the pre-simplified mesh by removing a portion of 3D coordinate points only from polygons of the pre-simplified mesh that do not span any of the set of local splitting planes associated with the non-leaf child node.

In some such embodiments, the iteratively adding nodes further includes storing a parent splitting plane to the set of local splitting planes associated with the lowest-level node when the lowest-level node was produced by splitting a mesh of parent node in the tree data structure according to the parent splitting plane. Additionally or alternatively, the iteratively adding nodes can further include determining the candidate splitting plane for the lowest-level node, such that the generated at least two child meshes have similar face counts. Additionally or alternatively, the iteratively adding nodes can further include determining the candidate splitting plane for the lowest-level node in at least one iteration according to a longest axis of the candidate mesh. Additionally or alternatively, the iteratively adding nodes can further include, wherein the raw 3D mesh is a skeletal mesh having skeletal sub-meshes coupled by joints, determining the candidate splitting plane for the lowest-level node in at least one iteration according to the joints.

In some such embodiments, computing the simplified mesh includes determining a set of unprotected coordinate points of the pre-simplified mesh as the coordinate points of the pre-simplified mesh that are not part of any polygons of the pre-simplified mesh that span any of the set of local splitting planes associated with the non-leaf child node, wherein the removed portion of 3D coordinate points is a subset of the set of unprotected coordinate points. Additionally or alternatively, computing the simplified mesh can further include: computing, for each unprotected coordinate point of the pre-simplified mesh, an impact magnitude corresponding to a length of a line segment drawn between the unprotected coordinate point and a simplified surface produced by removing the unprotected coordinate point from the pre-simplified mesh; and determining the removed portion of 3D coordinates by determining the subset of the set of unprotected coordinate points having lowest respective impact magnitudes.

Some such embodiments of the method can further include first rendering a first continuous level of detail (CLOD) representation of the 3D model by rendering an active front comprising a selected subset of the nodes of the H-CLOD tree data structure that combine to form the CLOD representation, the subset of the nodes selected according to a virtual camera position relative to the 3D model. Certain such embodiments can further include: determining an updated virtual camera position subsequent to the first rendering; determining, for each of at least a subset of the nodes in the active front, according to the updated virtual camera position, whether to increase a level of detail associated with the node or to decrease the level of detail associated with the node; updating the active front by, for each of at least the subset of the nodes in the active front, replacing the node in the active front with its children nodes if it is determined to decrease the level of detail associated with the node, and replacing the node in the active front with its parent node if it is determined to decrease the level of detail associated with the node; and second rendering a second CLOD representation of the 3D model by rendering the updated active front. In some implementations, determining, for each of at least a subset of the nodes in the active front, according to the updated virtual camera position, whether to increase the level of detail associated with the node or to decrease the level of detail associated with the node can include: computing a screen space error for the node by projecting an error container associated with the node to a screen space defined according to the updated virtual camera position; determining to increase the level of detail associated with the node when the screen space error for the node in the updated virtual camera position exceeds a first predetermined threshold; and determining to decrease the level of detail associated with the node when the screen space error for the node in the updated virtual camera position falls below a second predetermined threshold. Certain such implementations further include computing an error container for the node by: generating, for each of at least a subset of the 3D coordinate points removed from the pre-simplified mesh to compute the simplified mesh stored by the node, a line segment from the removed 3D coordinate point to the simplified mesh; translating the line segments to a common origin; and fitting the error container to the line segments.

In some such embodiments, the method further includes: computing a simplified sub-root mesh from a root mesh by removing a portion of 3D coordinate points from the root mesh, the root mesh stored by the root node of the H-CLOD tree data structure subsequent to the iteratively generating; and storing the sub-root mesh to a sub-root node added to the H-CLOD tree data structure as a parent to the root node. According to some embodiments of the method: the raw 3D mesh is constructed by tessellating the 3D model to form a plurality of polygons defined by 3D coordinate points connected by edges; each generated child mesh comprises a subset of the 3D coordinate points; and each node of the H-CLOD tree data structure stores its respective mesh as a plurality of indices, each index corresponding to a 3D coordinate point of the respective mesh.

According to another set of embodiments, a three-dimensional (3D) model rendering system is provided using hierarchical continuous level of detail (H-CLOD). The system includes a data storage subsystem and an H-CLOD generator. The data storage subsystem includes: a raw mesh store having raw 3D mesh data stored thereon, the raw 3D mesh data constructed by tessellating a 3D model to generated a plurality of polygons defined by 3D coordinate points connected by edges; and an H-CLOD data store having an H-CLOD tree data structure comprising a plurality of hierarchically arranged nodes, each node storing a mesh representation of a portion of the raw 3D mesh data at a respective level of detail. The H-CLOD generator includes: a raw mesh input in communication with the raw mesh store; and an H-CLOD output in communication with the H-CLOD data store. The H-CLOD data store receives the mesh representations via the H-CLOD output, such that the mesh representation of each child node corresponds to a sub-mesh split from a parent mesh according to a parent splitting plane, and such that the mesh representation of each parent node is a combination of the mesh representations of its children nodes simplified only in regions not touching the parent splitting plane.

In some such embodiments, the H-CLOD generator further includes a tree constructor that generates a tree data structure by: storing a raw 3D mesh of the 3D model to a root node of an unsimplified tree data structure; and iteratively adding nodes to the unsimplified tree data structure from the raw 3D mesh by, for each lowest-level node of the tree data structure, until each lowest-level node has an associated mesh that is smaller than a predetermined bucket size: splitting the candidate mesh according to a candidate splitting plane determined for the lowest-level node to generate at least two child meshes; storing the candidate splitting plane to the set of local splitting planes; and storing each of the at least two child meshes to a respective child node added to the lowest-level node, such that each child node becomes a lowest-level node in a respective branch of the unsimplified tree data structure. In such embodiments, the mesh representations are generated for each node of the H-CLOD tree data structure from the respective meshes of corresponding nodes of the unsimplified tree data structure. In some such embodiments, the mesh representations are generated for each node of the H-CLOD tree data structure from the respective meshes of corresponding nodes of the unsimplified tree data structure by, for each non-leaf child node of the unsimplified tree data structure: combining all meshes stored by children nodes of the non-leaf child node to form a pre-simplified mesh; and computing a simplified mesh from the pre-simplified mesh by removing a portion of 3D coordinate points only from polygons of the pre-simplified mesh that do not span any of the set of local splitting planes associated with the non-leaf child node.

In some such embodiments, the 3D model rendering system further includes a renderer that has an H-CLOD input in communication with the H-CLOD data store, and a rendered data output in communication with a rendered data store of the storage subsystem. The rendered data output includes a first continuous level of detail (CLOD) representation of the 3D model, output by the renderer according to rendering an active front comprising a selected subset of the nodes of the H-CLOD tree data structure that combine to form the CLOD representation, the subset of the nodes selected according to a virtual camera position relative to the 3D model. In some such embodiments, the rendered data output further includes a second CLOD representation of the 3D model output by the renderer according to: determining an updated virtual camera position subsequent to the first rendering; determining, for each of at least a subset of the nodes in the active front, according to the updated virtual camera position, whether to increase a level of detail associated with the node or to decrease the level of detail associated with the node; updating the active front by, for each of at least the subset of the nodes in the active front, replacing the node in the active front with its children nodes if it is determined to decrease the level of detail associated with the node, and replacing the node in the active front with its parent node if it is determined to decrease the level of detail associated with the node; and second rendering the second CLOD representation of the 3D model by rendering the updated active front.

According to another set of embodiments, another three-dimensional (3D) model rendering system is provided using hierarchical continuous level of detail (H-CLOD). The system includes a data storage subsystem and a renderer. The data storage subsystem includes: a raw mesh store having raw 3D mesh data stored thereon, the raw 3D mesh data constructed by tessellating a 3D model to generated a plurality of polygons defined by 3D coordinate points connected by edges; and an H-CLOD data store having an H-CLOD tree data structure comprising a plurality of hierarchically arranged nodes, each node storing a mesh representation of a portion of the raw 3D mesh data at a respective level of detail, such that the mesh representation of each child node corresponds to a sub-mesh split from a parent mesh according to a parent splitting plane, and such that the mesh representation of each parent node is a combination of the mesh representations of its children nodes simplified only in regions not touching the parent splitting plane. The renderer includes: an H-CLOD input in communication with the H-CLOD data store; and a rendered data output in communication with a rendered data store of the storage subsystem. The rendered data output comprises a first continuous level of detail (CLOD) representation of the 3D model, output by the renderer according to rendering an active front comprising a selected subset of the nodes of the H-CLOD tree data structure that combine to form the CLOD representation, the subset of the nodes selected according to a virtual camera position relative to the 3D model.

BRIEF DESCRIPTION OF THE DRAWINGS

The present disclosure is described in conjunction with the appended figures.

Figure 1:
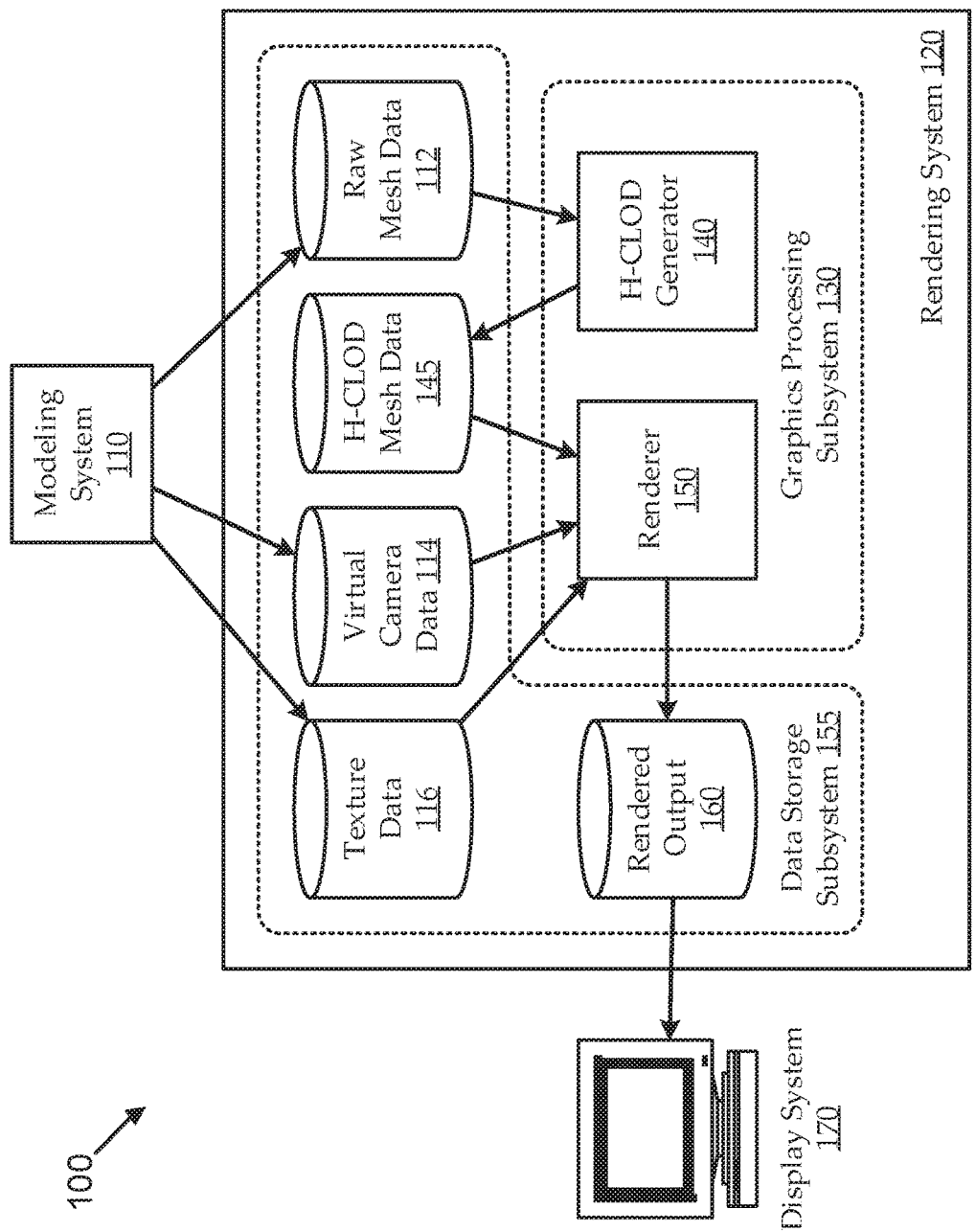
FIG. 1 shows an illustrative three-dimensional (3D) graphics system, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring embodiments.

In three-dimensional computer graphics environments, objects in a scene are typically modeled as three-dimensional meshes made up of primitives (e.g., triangles or other polygons into coordinate points connected by edges). Rendering and displaying a three-dimensional object can often involve large numbers of computations to determine locations of, and complex interactions with, those coordinate points and edges, and the faces formed therefrom. Various techniques can be used to reduce the complexity of the meshes, thereby reducing the computational intensity involved in rendering and displaying the objects represented by the meshes. However, it is typically desirable to reduce complexity without negatively impacting visual experience. For example, it can be desirable to determine which level of detail to use when rendering a mesh, so that the mesh is detailed enough to provide a desired level of fidelity without being so detailed as to overburden rendering resources.

Conventional approaches to level-of-detail handling tend to exhibit various limitations. Some such limitations relate to dynamically re-evaluating an appropriate level of detail for objects in a scene with each repositioning of a virtual camera. As real-time computation of level of detail is often impractical once a scene becomes sufficiently complex, conventional approaches tend to swap in pre-computed levels of detail as desired, which can manifest undesirable visual artifacts. For example, as a virtual camera moves through a three-dimensional environment relative to objects in the environment, and/or as objects in the environment move relative to the virtual camera, abrupt changes in an object's rendered level of detail can cause the object to appear to "pop." In some instances, additional techniques can be involved in handling these and other artifacts in particularly sensitive regions, such as at the "silhouette edge" of an object (e.g., from the perspective of a virtual camera, there is a region of the surface where the outward-facing surface normals become perpendicular to the view vector, for example, where there is a transition from front-facing faces to back-facing faces).

Some other limitations to conventional level of detail handling arise when determining an appropriate level of detail for large objects or objects spanning a large range of distances from a virtual camera. For example, conventional approaches tend to use higher levels of detail for objects closer to the foreground of the scene (with respect to the virtual camera position) and lower levels of detail for objects farther to the background of the scene. However, some objects may span from the foreground into the background, such as a large building or creature, such that there may be no single level of detail that is appropriate for the entire object. In such instances, the level of detail tends to be selected according to a closest portion of the mesh, potentially yielding a highly sub-optimal level of detail for portions of the mesh further from the virtual camera position. To address such limitations, some conventional approaches attempt to split the mesh into sub-meshes and to determine appropriate, and potentially different, levels of detail for each sub-mesh. However, such approaches often produce undesirable visual artifacts at the sub-mesh edges, including visible boundaries, sub-mesh level of detail popping, lighting and/or texture mapping artifacts, etc.

Among other things, embodiments described herein seek to address the above and other limitations of conventional approaches to level of detail handling. To that end, systems and methods are described for using hierarchical continuous level of detail (H-CLOD) trees with inherited splitting plane partitioning to reduce visual artifacts in continuous level of detail renderings. The H-CLOD tree for an object mesh can be generated by iteratively populating a hierarchical tree with sub-meshes at each node, each sub-mesh generated by splitting a parent mesh according to a respective splitting plane; then simplifying the generated sub-meshes in a bottom-up traversal of the tree to iteratively generate simplified parent meshes. The simplification can yield an H-CLOD tree that has a most simplified (e.g., lowest detail, or lowest fidelity) version of the original mesh as its root node, and an un-simplified (e.g., highest detail, or highest fidelity) version of the original mesh formed by a combination of the leaf nodes. At render time, embodiments can traverse the H-CLOD tree to produce a desired level of detail from the pre-computed nodes of the tree. The determination of which nodes to render can be dynamically updated with changes in relative position between the meshes and a virtual camera. For example, techniques are described herein for determining an error (e.g., indicating an apparent degradation in fidelity) associated with a particular mesh's node relative to the virtual camera position, and the error can be used to determine whether to render the current mesh's node, its parent mesh, or its children meshes.

Turning to FIG. 1, an illustrative three-dimensional (3D) graphics system 100 is shown, according to various embodiments. The graphics system 100 includes a modeling system 110, a rendering system 120, and a display system 170. Embodiments of the modeling system 110 can be used to model objects in a 3D environment using meshes. For example, 3D modeling applications typically provide tools and interfaces through which to model volumes of arbitrary complexity, and those volumes can be tessellated or otherwise converted into one or more renderable meshes. Each mesh is made up of coordinate points connected by edges to define primitives (e.g., triangles or other polygons), and the primitives effectively define the rendered faces of surfaces making up the represented object. The primitives (or faces) can influence various features of the model and/or how the model behaves in the 3D environment, such as how texture maps are applied to the model, how the model interacts with lighting, how the model interacts with modeled physics, etc. The meshes can be generated at various fidelities (i.e., with different numbers of faces) depending on various considerations, such as complexity of the volume being represented, desired model file size, etc.

Embodiments of the rendering system 120 convert the 3D objects from the modeling system 110 into one or more two-dimensional (2D) images (e.g., thought the rendered images are 2D, some rendered outputs can include stereographic features, multiple viewpoints, or other features that allow a display system 170 to simulate 3D viewing). The rendered images can include photorealistic or non-photorealistic characteristics, such as those resulting from modeling the effects of virtual lighting and/or other environmental conditions on the object models. The rendered outputs can be displayed by the display system 170. For example, the display system can include any suitable display hardware and/or software, such as one or more displays, virtual reality headsets, projectors, etc.

The rendering system 120 can include a number of subsystems, including those illustrated in FIG. 1. While the component systems and subsystems are shown as directly coupled, and/or otherwise arranged according to a particular architecture, the components can be arranged and/or distributed in any suitable manner. For example, the components can be collocated, distributed and in communication via one or more networks, etc. Further, the various subsystems described herein can include hardware and/or software component(s) and/or module(s), including, but not limited to circuits, application specific integrated circuits (ASICs), general purpose processors, digital signal processors (DSPs), field programmable gate arrays (FPGAs), programmable logic devices (PLD), discrete gates, transistor logic devices, discrete hardware components, or combinations thereof. For example, steps of methods or algorithms, or other functionality described in connection with embodiments, can be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

As illustrated, embodiments of the rendering system 120 include a graphics processing system 130 and a data storage subsystem 155. The data storage subsystem 155 can include any suitable storage, including local storage drives, remote (e.g., networked or cloud-based) storage drives, etc. The data storage subsystem 155 can store any suitable data for supporting rendering functions, including, for example, raw mesh data 112, virtual camera data 114, texture data 116, H-CLOD mesh data 145, and rendered output data 160.

The graphics processing system 130 can include any suitable components, such as an H-CLOD generator 140 and a renderer 150. Rendering of 3D graphics can involve large numbers of computations, which can consume large amounts of computing resources, power, time, etc. Such resource consumption can often place undesirable practical limits on model fidelities, scene sizes, and/or other features of a 3D environment, particularly in context of real-time rendering of arbitrary meshes, and the like. One technique for partially addressing these and other such issues is by implementing the graphics processing system 130 (i.e., the H-CLOD generator 140 and/or the renderer 150) using one or more graphics processing units (GPU), visual processing units (VPU), and/or specialized processors, circuits, frame buffers, etc. for accelerating graphics-related computations. However, as complexities and fidelities of models and scenes continue to increase, even specialized hardware often has computational limitations. Accordingly, other techniques seek to identify opportunities for improving graphics processing hardware by simplifying computational complexity without noticeably impacting viewing experience. Some such simplification techniques focus on selectively simplifying meshes, for example, by rendering lower fidelity meshes for objects further in the background of a scene and higher fidelity meshes for objects further in the foreground of a scene.

Figure 2:
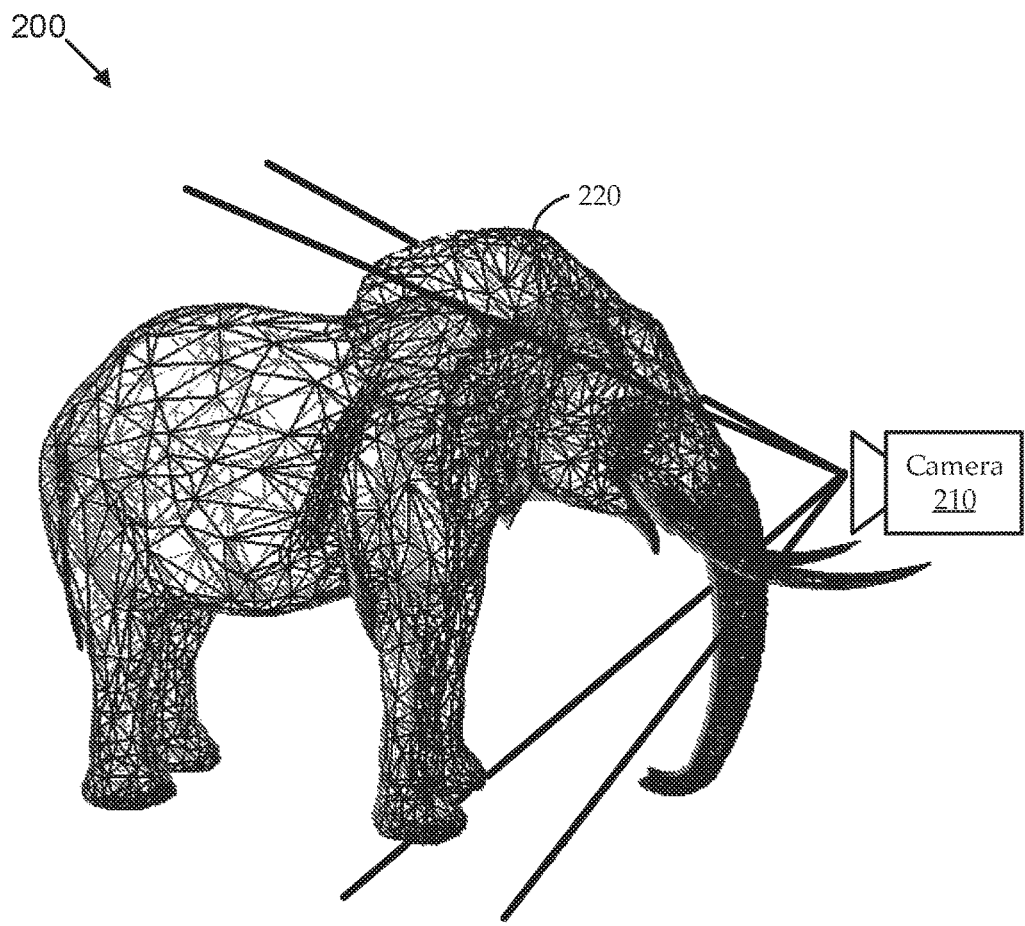
FIG. 2 shows an illustrative modeling environment, including a 3D mesh tessellated from a 3D model of an elephant, and a virtual camera positioned with respect to the 3D mesh.

For the sake of context, FIG. 2 shows an illustrative modeling environment 200, including a 3D mesh 220 tessellated from a 3D model of an elephant, and a virtual camera 210 positioned with respect to the 3D mesh 220. The illustrated 3D mesh 220 is an "arbitrary mesh," meaning that the mesh describes a relatively arbitrary volume (e.g., as opposed to a simple, mathematical 2D or 3D shape, such as a sphere, plane, etc.). As illustrated, the 3D mesh 220 defines a large number of polygons (triangles), each formed from coordinate points connected by edges. The triangles effectively define faces of a surface described by the 3D mesh 220; and more faces can permit higher fidelity in rendering of the 3D mesh 220. Rendering of the 3D mesh 220 can involve projecting the polygons into a screen space, which is a two-dimensional plane defined according to the virtual camera position 210.

Graphics processing hardware often tends to operate more effectively when the projection into screen space yields similarly sized polygons. Accordingly, it can be desirable for triangles farther from the virtual camera 210 to be larger than those closer to the virtual camera 210, and for the size differences to account for perspective. When a single modeled object spans a range of distances from the virtual camera 210, as illustrated, generating a 3D mesh 220 with appropriately sized faces can involve independently selecting an appropriate level of detail for each of a number of sub-meshes, and combining those sub-meshes in a manner that appears seamless in displayed rendering output. Maintaining appropriate levels of detail can involve dynamically updating sub-mesh levels of detail with each change in position (e.g., distance, orientation, etc.) of the sub-meshes with respect to the virtual camera 210.

Returning to FIG. 1, embodiments described herein seek to improve operation of hardware on graphics processing using novel approaches for selectively simplifying meshes and for rendering such meshes. In particular, embodiments generate a hierarchical continuous level of detail (H-CLOD) tree having nodes containing hierarchically arranged sub-meshes of varying levels of detail. By selecting which level of nodes to render across the branches of the H-CLOD tree, an appropriate level of detail can be substantially seamlessly output by the renderer 150. As described in more detail below, the H-CLOD tree can permit rendered output data 160 from the renderer 150 to have levels of details that are independently and efficiently selected at a sub-mesh level in a manner that avoids visible sub-mesh seams, accounts for screen space error, and provides other features. Further, techniques are described herein for applying H-CLOD embodiments to arbitrary meshes of arbitrary complexity, skinned meshes, skeletal meshes (i.e., those having multiple sub-meshes connected by movable joints, or the like), and other contexts.

As described above, conventional approaches to dynamically changing level of detail tend to produce undesirable visual artifacts. As one example, abrupt changes in level of detail from one frame to another can manifest as level of detail popping. As another example, use of different levels of detail in adjacent sub-meshes can manifest visible sub-mesh boundaries, artifacts at silhouette edges of the mesh, etc.

H-CLOD embodiments described herein address these and other limitations of conventional approaches in a number of ways. As one example, the H-CLOD tree is generated in a manner that inherits splitting planes and pre-computes simplified meshes and sub-meshes with an awareness of those splitting planes, thereby mitigating visibility of sub-mesh boundaries. As another example, embodiments are described herein for computing screen space error in association with nodes of the H-CLOD tree to facilitate efficient selection of active front nodes to render in context of changes in relative virtual camera 210 position.

For the sake of added clarity, capabilities of the various system components are described more fully herein in context of various illustrative flow diagrams, illustrative meshes, and the like, in FIGS. 3-16. While certain embodiments are described in a manner that ascribes certain functionality to certain components, it will be appreciated that the system of FIG. 1 can be used to perform methods other than those described herein, and the methods described herein can be performed using systems other than the one illustrated in FIG. 1.

Figure 3:
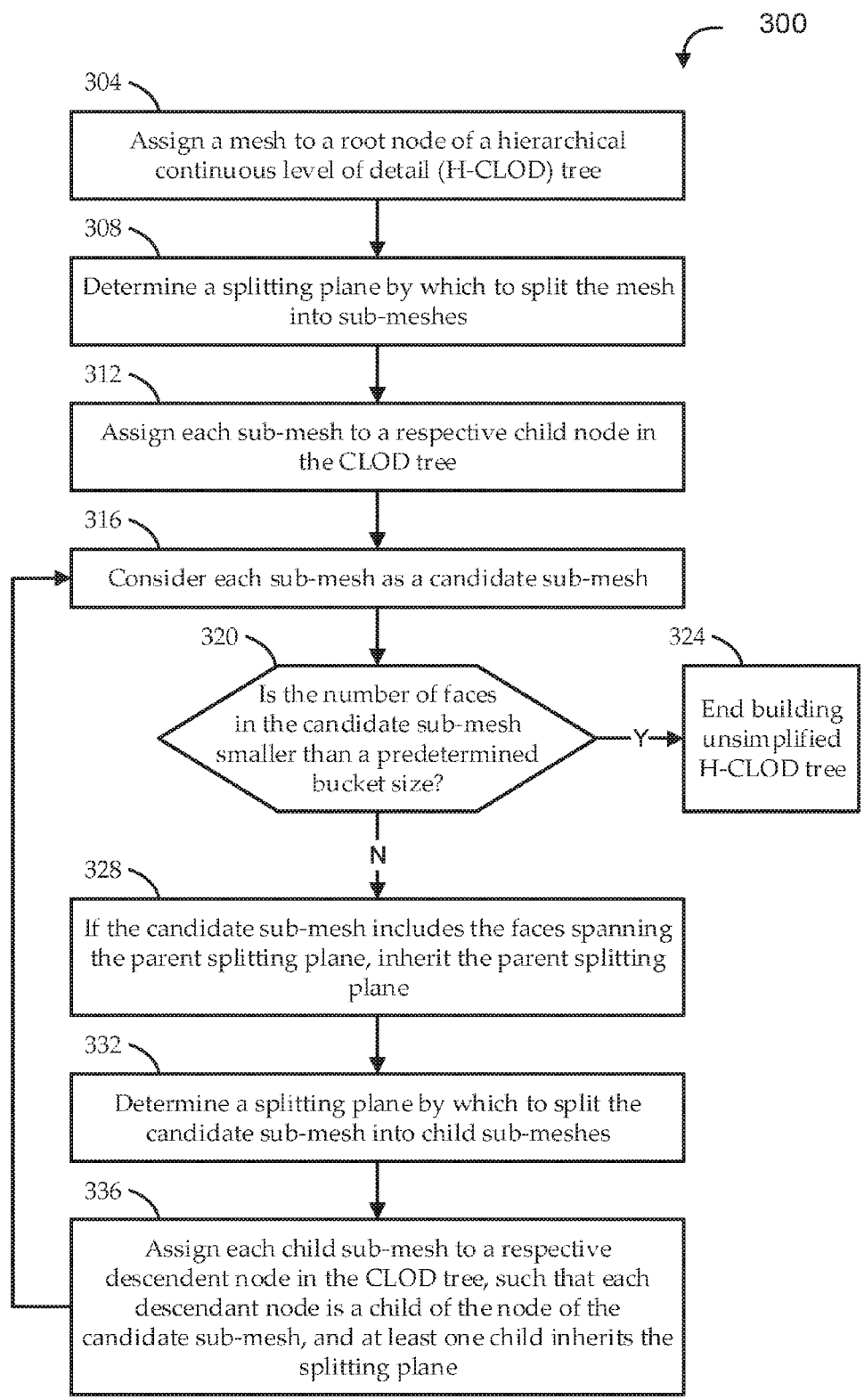
FIG. 3 shows a flow diagram of an illustrative method for building an un-simplified H-CLOD tree data structure, according to various embodiments.
Figure 4A:
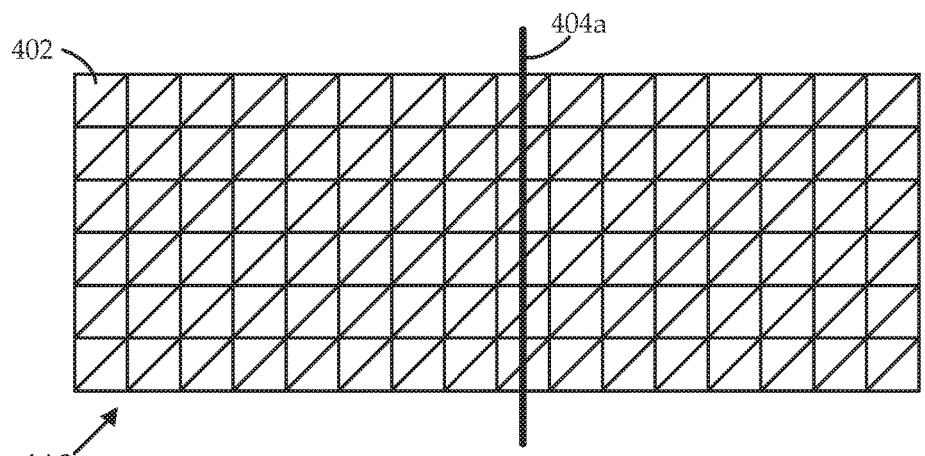
FIGS. 4A-4C show simple meshes that illustrate stages of the method of FIG. 3.
Figure 4B:
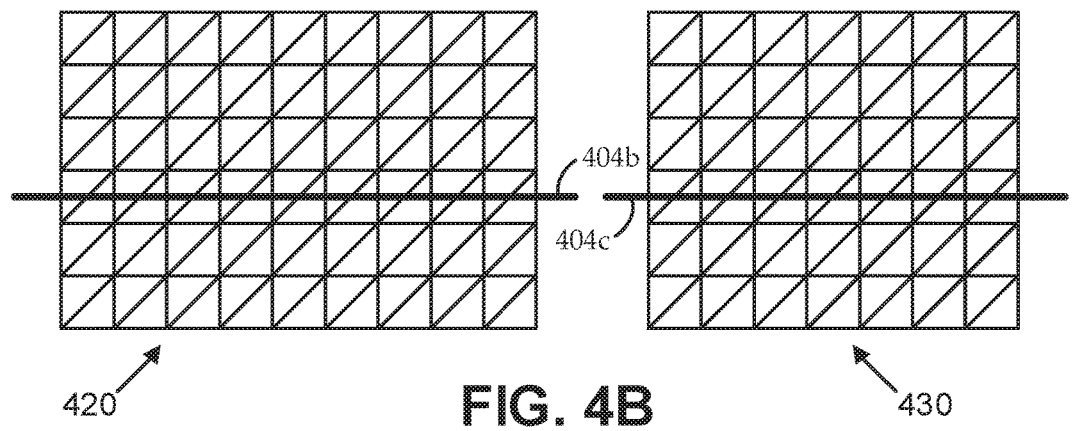
Figure 4C:
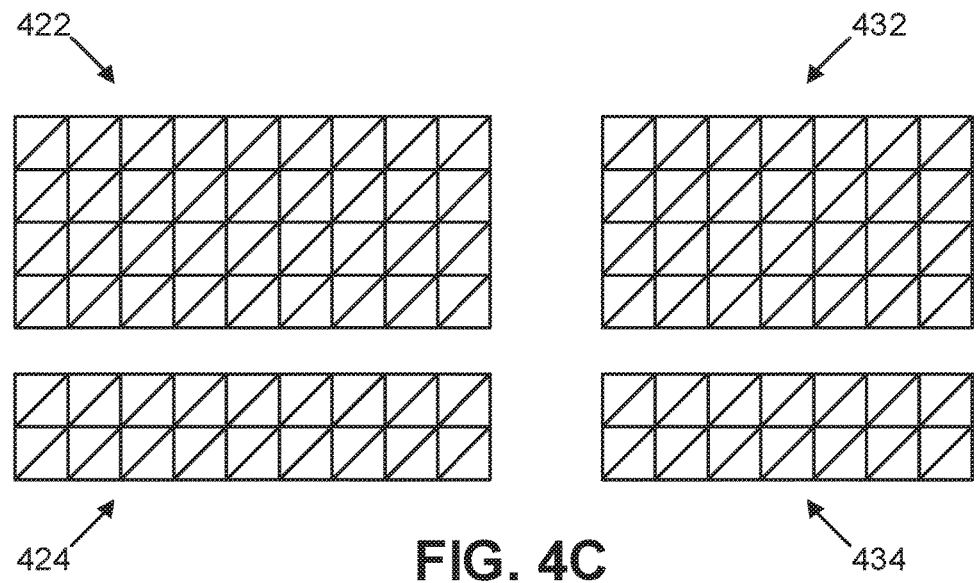
Figure 5A:
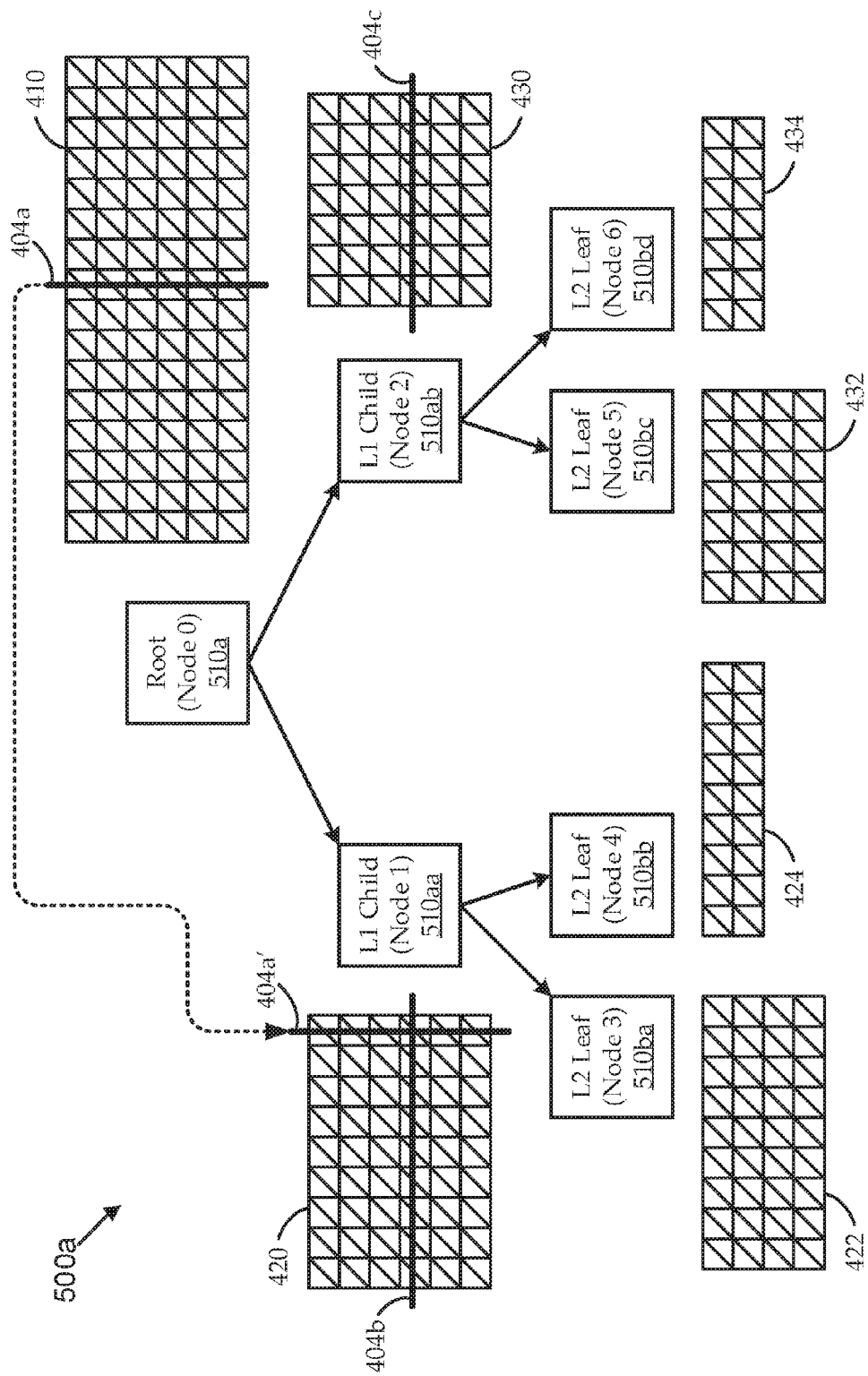
FIGS. 5A and 5B show an illustrative un-simplified H-CLOD tree data structure built by the method of FIG. 3.
Figure 5B:
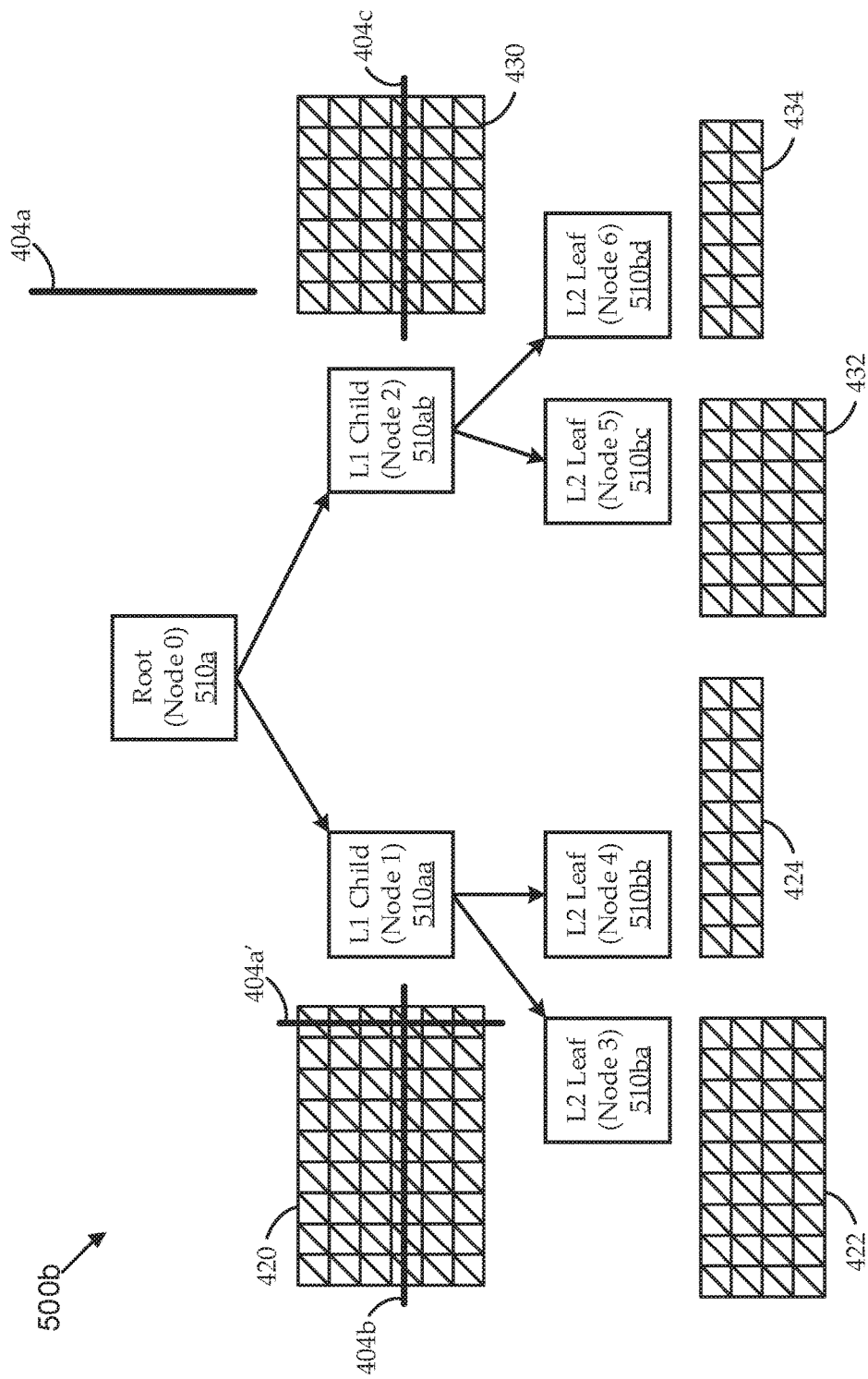

FIG. 3 shows a flow diagram of an illustrative method 400 for building an un-simplified H-CLOD tree data structure, according to various embodiments. For added clarity, FIGS. 4A-4C show simple meshes that illustrate stages of the method 300 of FIG. 3; and FIGS. 5A and 5B show an illustrative un-simplified H-CLOD tree data structure 500 built by the method of FIG. 3. In general, the H-CLOD data structure can be built by iteratively splitting the mesh into smaller sub-meshes, until all sub-meshes are smaller than a predetermined bucket size. Embodiments begin at stage 304 by assigning a mesh to a root node of a hierarchical continuous level of detail (H-CLOD) tree. Referring to FIG. 1, the assigned mesh can be raw 3D mesh data 112 received by the H-CLOD generator 140 from the modeling system 110. For example, the received raw mesh data 112 can include a 3D wireframe mesh of coordinate points formed by tessellating a 3D model at a particular (e.g., high) fidelity. An illustrative root node mesh 410 is shown in FIG. 4A as having 192 faces.

Various features are described herein with reference to storing a mesh to a node, assigning a mesh to a node, or the like. In some embodiments, this can involve storing an instance of the wireframe mesh in a node of the H-CLOD tree data structure. However, other embodiments can represent the mesh (e.g., the raw 3D mesh data 112) as a list of index numbers, each representing a coordinate point (vertex) of the mesh. As described herein, each level of detail representation of a mesh includes all, or a subset, of the coordinate points or edges of the raw mesh data 112. Accordingly, in such embodiments, some or all nodes of the H-CLOD tree can include list of the index numbers (e.g., the subset of vertices) used to form the level of detail representation associated with that node.

At stage 408, a splitting plane can be determined by which to split the mesh into sub-meshes. For example, as illustrated in FIG. 4A, the splitting plane 404*a* can be determined by defining an axis through a set of faces that splits the mesh into similarly sized sub-meshes (e.g., respective face counts of the sub-meshes are as close to equal as possible). For example, as shown in FIGS. 4A and 4B, root node mesh 410 is split by splitting plane 404*a* into a first sub-mesh 420 of 108 faces and a second sub-mesh 430 of 84 faces. Notably, all faces spanning the splitting plane can be assigned to one of the sub-meshes. For example, in FIG. 4B, the first sub-mesh 420 includes all the faces from root node mesh 410 that span the splitting plane 404*a*. Though referred to herein as a "splitting plane," any suitable type of splitting datum can be used. In some embodiments, natural mesh divisions can be used as some or all splitting planes. For example, in context of a skeletal type of mesh, splitting planes can be defined at joints.

At stage 412, each sub-mesh can be assigned to a respective child node of the root node in the H-CLOD tree, and at least one of the children inherits the splitting plane from its parent. For example, as illustrated in FIG. 5A, the raw mesh is assigned to a root node ("Node 0") 510*a*, the first sub-mesh 420 is assigned to a first respective child node 510*aa* (shown as "Node 1" in Level 1, or "L1," of the tree 500*a*), and the second sub-mesh 430 is assigned to a second respective child node 510*ab* (shown as "Node 2" in Level 1 of the tree 500*a*). While only two child nodes are shown resulting from the splitting at stage 308, some embodiments can generate an arbitrary number of child nodes (e.g., when splitting planes are defined according to skeletal joints or some other model consideration).

Stages 316-332 continue iteratively to split each sub-mesh until all lowest-level sub-meshes (i.e., leaf node meshes) are less than a pre-determined bucket size (e.g., a predetermined number of faces, etc.). For example, at stage 316, each of the sub-meshes generated in stages 308 and 312 (e.g., sub-meshes 420 and 430) can be considered as "candidate" meshes for further splitting. For each candidate sub-mesh, at stage 320, a determination can be made as to whether the face count of the sub-mesh is smaller than the predetermined bucket size. If the face counts of all candidate sub-meshes are already less than the bucket size, the un-simplified H-CLOD tree can be considered built at stage 324.

If the face counts of any candidate sub-mesh exceeds the bucket size, embodiments can proceed to further split those sub-meshes into smaller sub-meshes. In some embodiments, at stage 328, any candidate mesh that is larger than the bucket size and includes the polygons spanning its parent's splitting plane can inherit the parent's splitting plane. For example, the first sub-mesh 420 that includes the polygons spanning the splitting plane also inherits the splitting plane 404*a*, as indicated by the dashed arrow in FIG. 5A and by inherited splitting plane 404*a*'. At stage 332, a further splitting plane can be determined by which to split the candidate sub-mesh into further child sub-meshes. As in stage 308, the splitting plane can be defined in stage 332 to yield similarly-sized child sub-meshes. For example, FIGS. 4A-4C can assume a bucket size of 75 faces, and each of sub-meshes 420 and 430 has a face count exceeding 75 faces. For sub-mesh 420, a further splitting plane 404*b* can be defined to yield sub-meshes 422 and 424; and for sub-mesh 430, a further splitting plane 404*c* can be defined to form sub-meshes 432 and 434.

At stage 336, as in stage 312, each further child sub-mesh can be assigned to a child node of the candidate node from which it was formed by splitting. For example, as illustrated in FIG. 5A, sub-mesh 422 can be assigned to child node 510*ba* (shown as "Node 3" in Level 2, or "L2," of the tree 500*a*; as a first child of "Node 1" 510*aa* in Level 1 of the tree 500*a*), sub-mesh 424 can be assigned to child node 510*bb* (shown as "Node 4" in Level 2 of the tree 500*a*; as a second child of "Node 1" 510*aa* in Level 1 of the tree 500*a*), sub-mesh 432 can be assigned to child node 510*bc* (shown as "Node 5" in Level 2 of the tree 500*a*; as a first child of "Node 2" 510*ab* in Level 1 of the tree 500*a*), and sub-mesh 434 can be assigned to child node 510*bd* (shown as "Node 6" in Level 2 of the tree 500*a*; as a second child of "Node 2" 510*ab* in Level 1 of the tree 500*a*). Notably, some implementations do not pass splitting planes down to the leaf nodes (510*ba*, 510*bb*, 510*bc*, and 510*bd*) of the tree 500*a*. In the example of FIG. 4C, the second level of child nodes have 72, 36, 56, and 28 faces, respectively; and each of those face counts is less than the bucket size of 75 faces. In such an example, embodiments of the method 300 may iterate back to stage 316, thereby independently considering each second-level child node of FIG. 4C as a candidate for further splitting; determine at stage 320, for each candidate sub-mesh, that the face count is less than the bucket size; and end at stage 324 accordingly.

As illustrated by FIG. 5A, the meshes of each set of sibling nodes (i.e., child nodes sharing the same parent node) can be combined to form the mesh of their parent node. For example, meshes 422 and 424 from sibling nodes 510*ba* and 510*bb* can be combined to form mesh 420 of their parent node 510*aa*. Accordingly, as shown in FIG. 5B, some tree 500*b* implementations do not store the root node mesh 410 in node 510*a*. However, as illustrated, some implementations can maintain the local splitting plane of root node 510*a*, even if the root node mesh 410 is not stored. Because all the root node mesh 410 information is stored in the leaf nodes (and can be recreated therefrom, for example, by a bottom-up traversal of the tree), some implementations store meshes only in the leaf nodes, and use the other nodes of the H-CLOD tree to store only the local splitting planes for those nodes.

Figure 6:
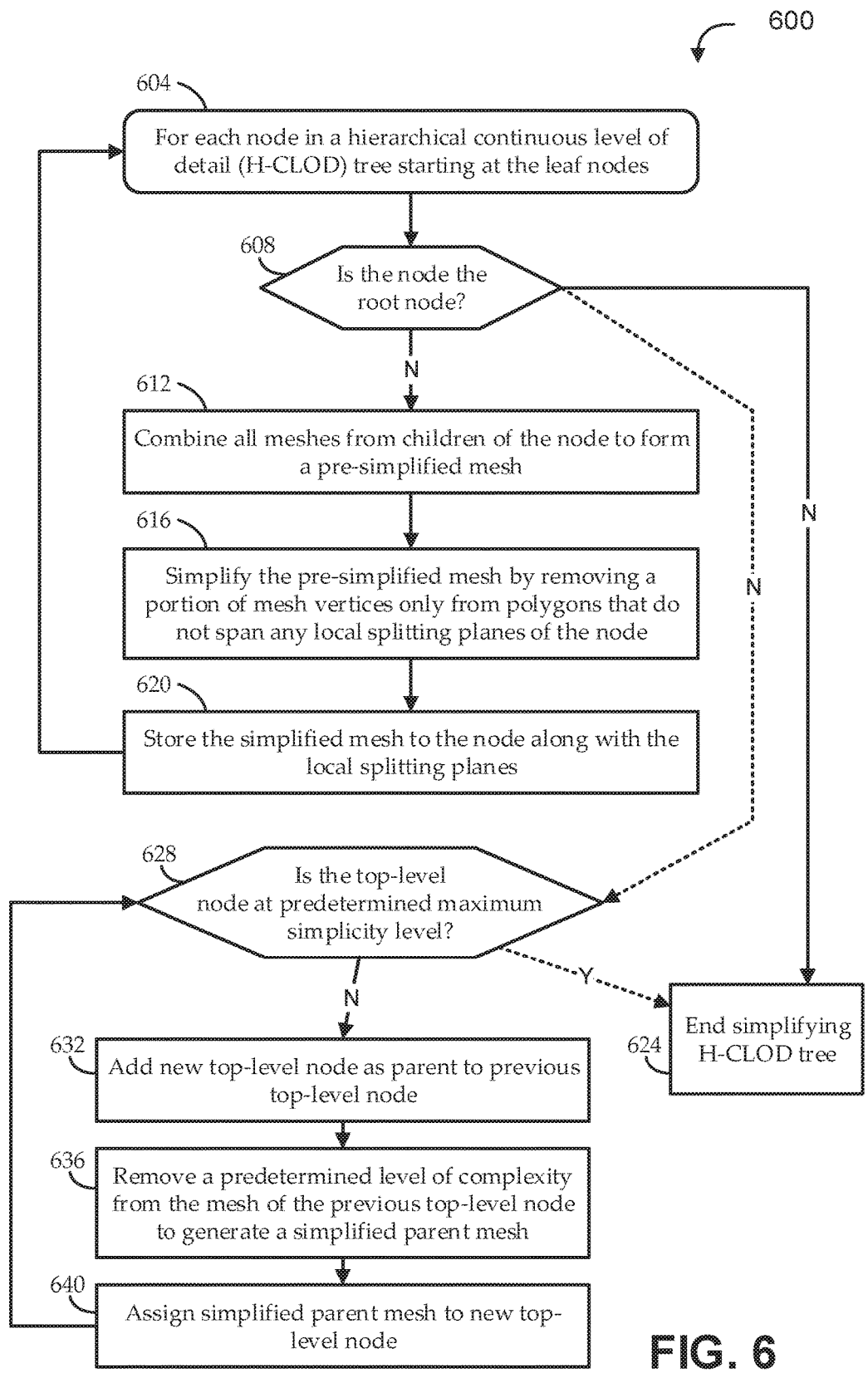
FIG. 6 shows a flow diagram of an illustrative method for simplifying an H-CLOD tree data structure, such as the one built by the method of FIG. 3, according to various embodiments.
Figure 7:
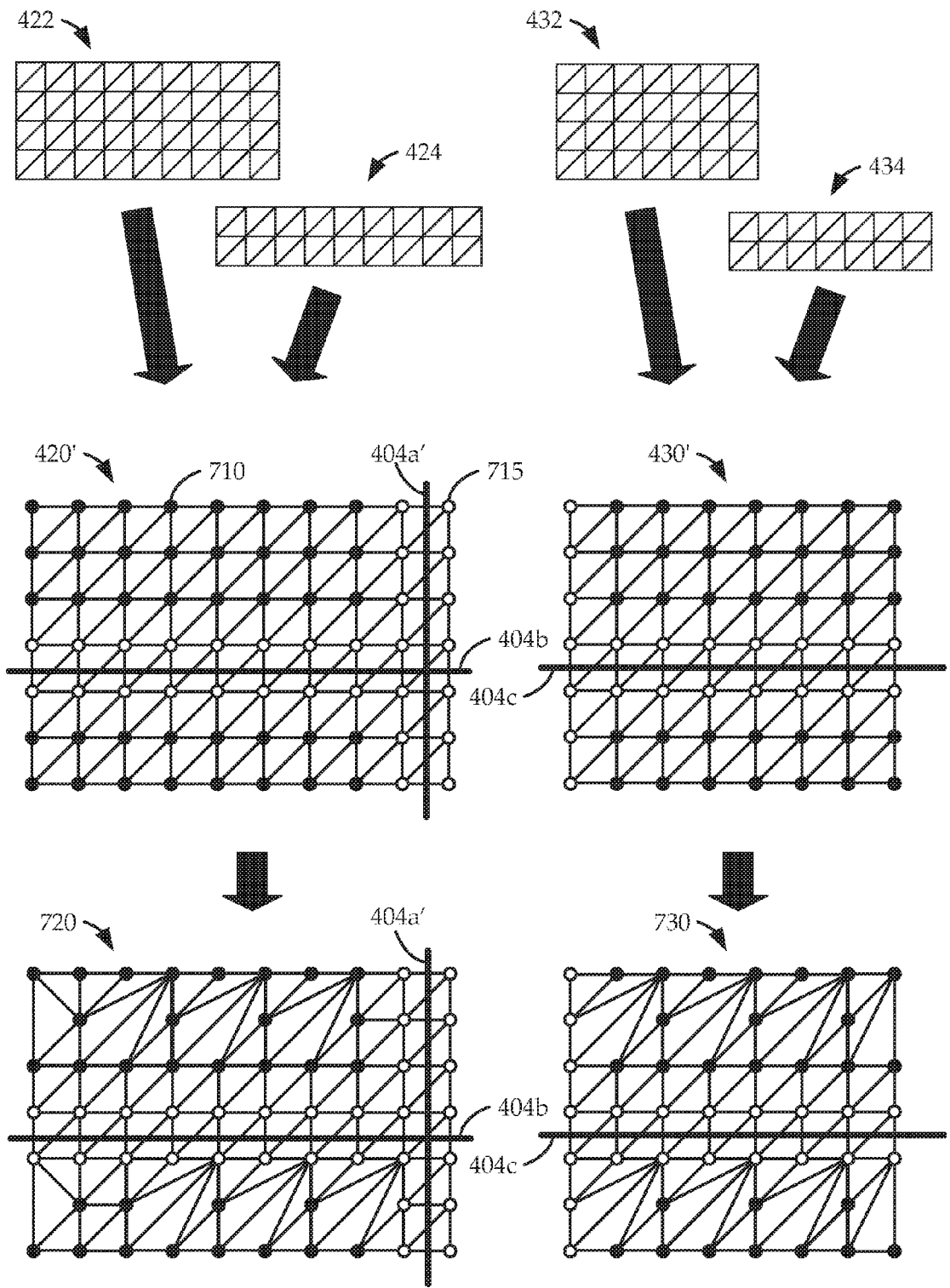
FIGS. 7 and 8 show simple meshes that illustrate stages of the method of FIG. 6.
Figure 8:
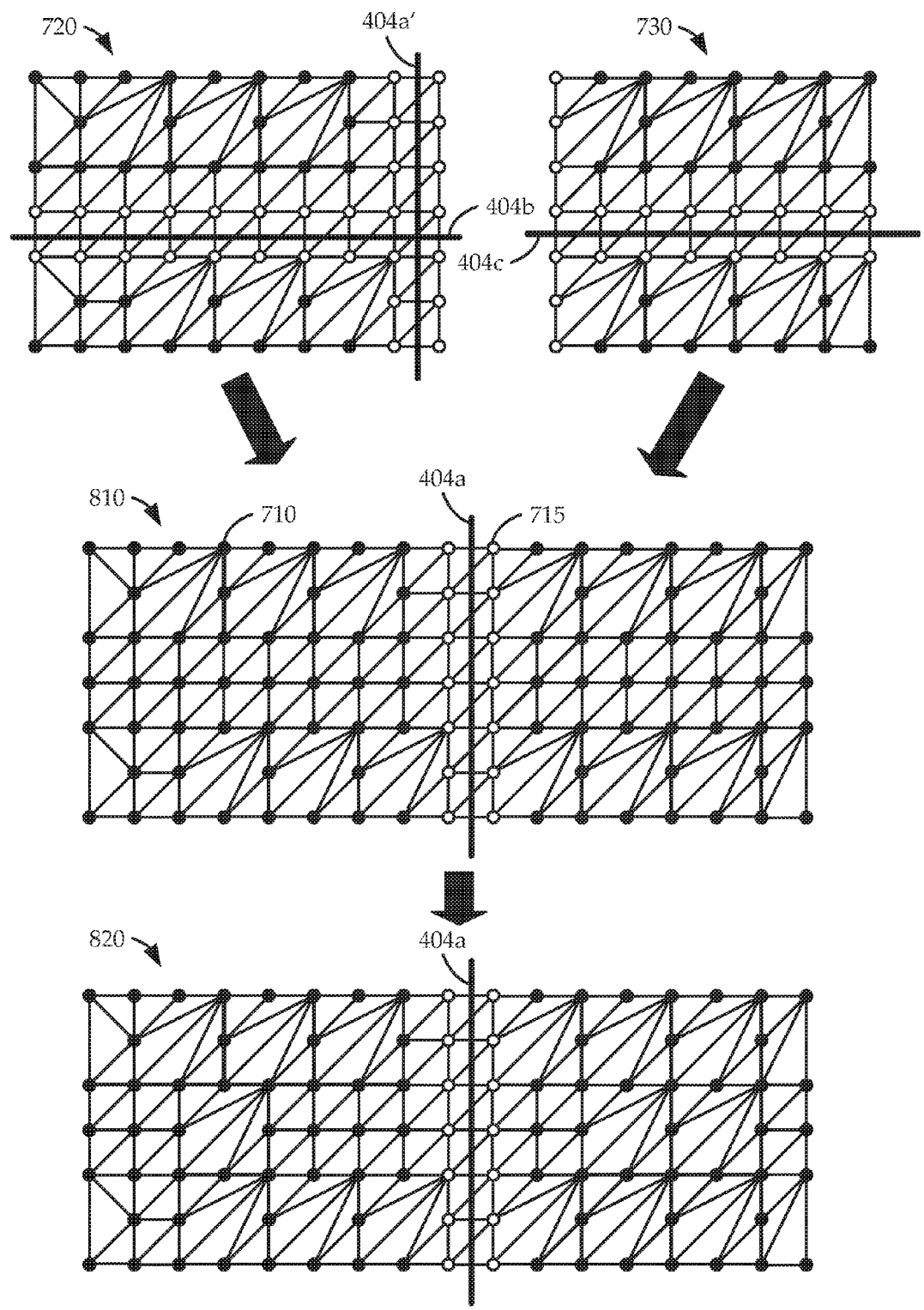
Figure 9:
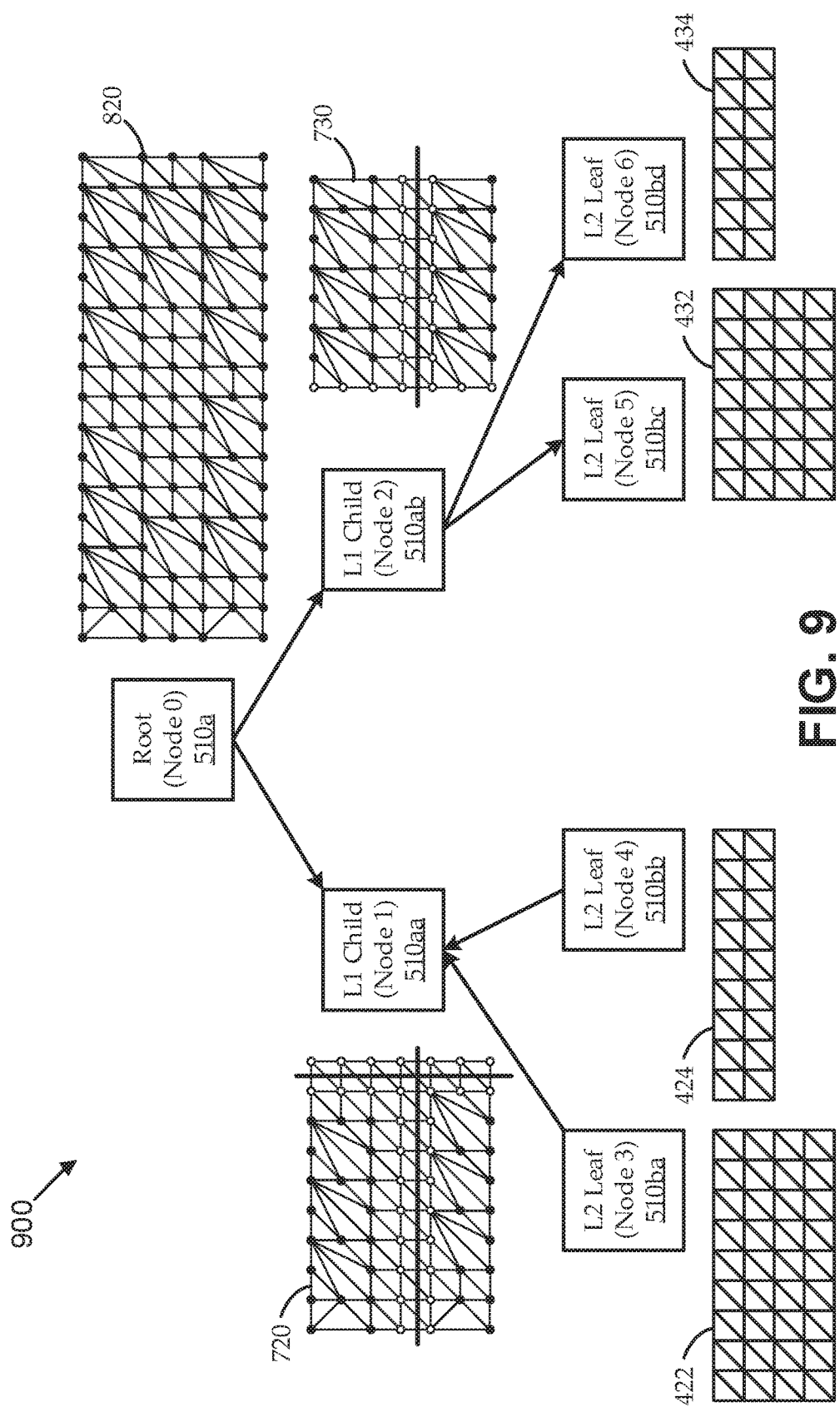
FIGS. 9 and 10 show illustrative un-simplified H-CLOD tree data structures built by the method of FIG. 6.
Figure 10:
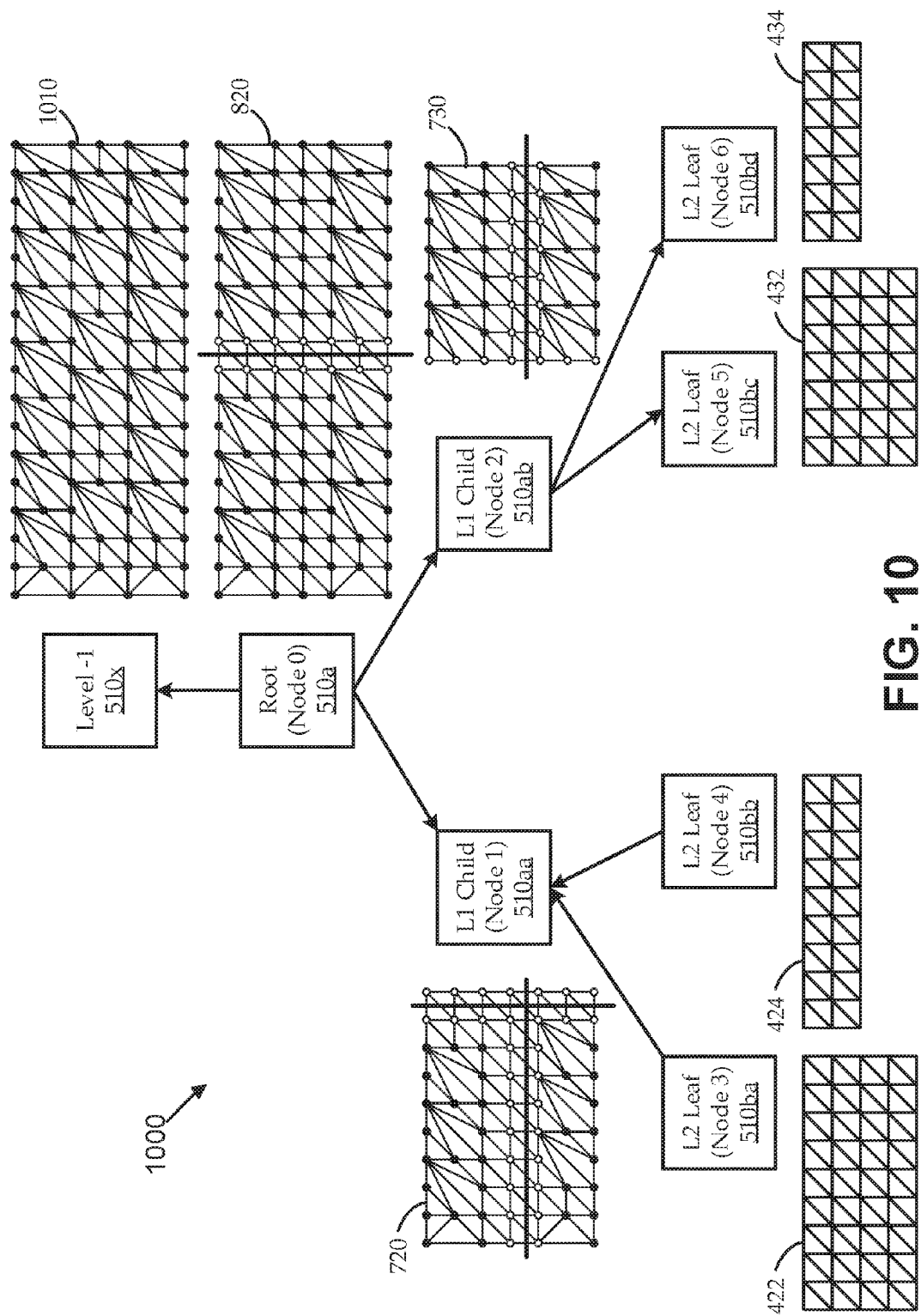
Figure 11:
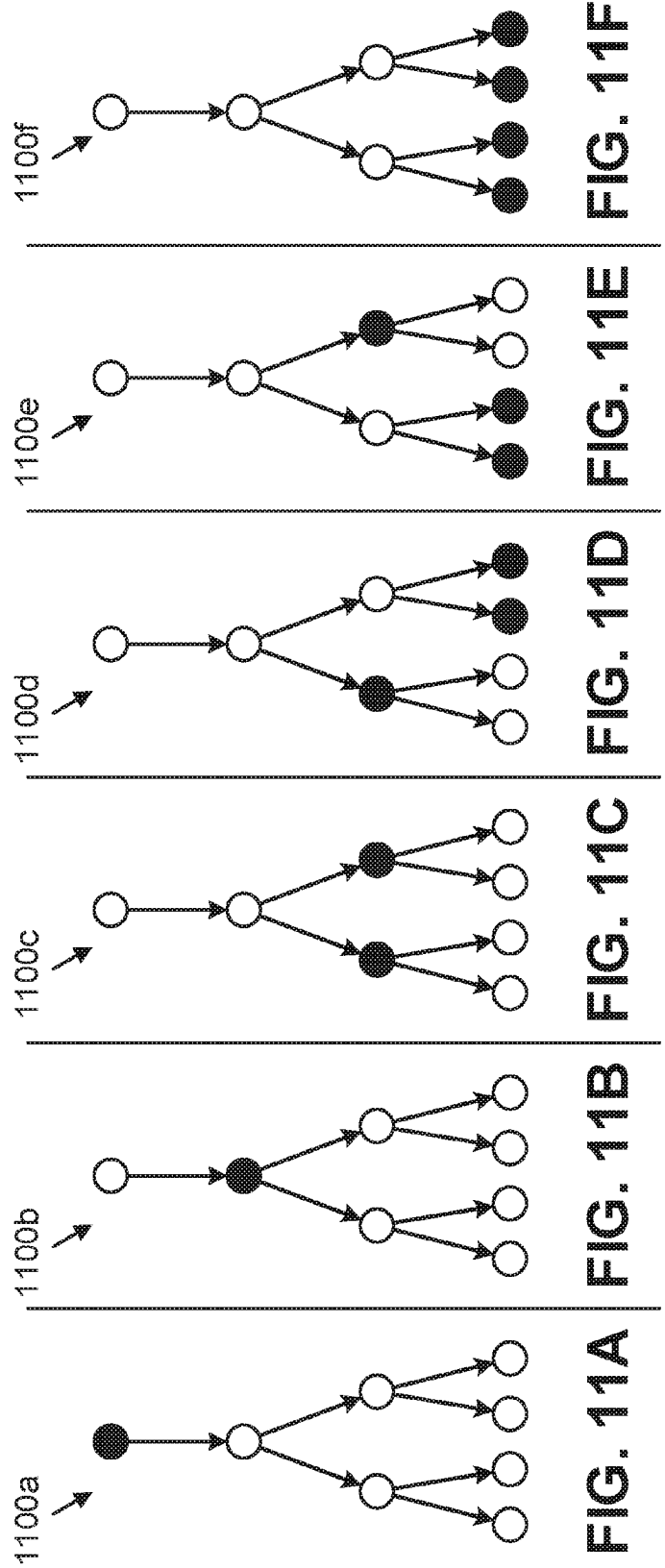
FIGS. 11A-11F show six different traversal options for an illustrative H-CLOD tree having four levels.

FIG. 6 shows a flow diagram of an illustrative method 600 for simplifying an H-CLOD tree data structure, such as the one built by the method 300 of FIG. 3, according to various embodiments. For added clarity, FIGS. 7 and 8 show simple meshes that illustrate stages of the method 600 of FIG. 6; and FIGS. 9 and 10 show illustrative un-simplified H-CLOD tree data structures built by the method of FIG. 6. In general, the H-CLOD data structure can be simplified by iteratively simplifying sibling nodes into respective simplified parent meshes without simplifying faces that span local splitting planes. Stages 604-620 describe such an iterative approach.

Embodiments begin iterations, at stage 604, for each node in an H-CLOD tree, beginning at the leaf nodes of the tree and continuing in a bottom-up traversal of the tree (some implementations can begin with the parent nodes of the leaf nodes). At stage 608, a determination is made as to whether the node of the present iteration is the root node of the tree. If so, the bottom-up traversal, and the resulting simplification, can be considered complete at stage 624. As described below, some embodiments can perform further simplifications. If it is determined at stage 608 that the traversal has not reached the root node of the tree (i.e., the current node has a parent), embodiments can combine all the meshes from children nodes of the current node at stage 612 to form a pre-simplified node. For example, in the first iteration, the combined child meshes may all be un-simplified leaf node meshes; while, in subsequent iterations, the combined child meshes may have been simplified in a previous iteration.

At stage 616, the pre-simplified mesh can be simplified by removing a portion of mesh vertices only from polygons that do not span any local splitting planes of the current node. For example, each mesh is made up of a number of faces defined by respective coordinate points connected by edges. For faces that do not span a splitting plane, a portion of the vertices can be removed from a portion of the faces, and vertices can be collapsed (e.g., edges collapsed to remaining coordinate points), until the mesh complexity (e.g., face count) is reduced by at least some threshold amount (e.g., fifty percent). At stage 620, the simplified mesh can be stored to the current node, along with the local splitting planes.

For example, FIG. 7 shows leaf node meshes 422 and 424 (described above in context of FIGS. 3-5B) being combined into pre-simplified mesh 420', and leaf node meshes 432 and 434 being combined into pre-simplified mesh 430'. Each has unprotected coordinate points 710 (represented by black circles) and protected coordinate points 715 (represented by white circles), where the protected coordinate points 715 are part of polygons that span one or more splitting planes 404 (including local splitting planes 404*b* and 404*c*, and 404*a*' inherited from the parent node). Notably, though mesh 430 did not inherit the splitting plane 404*a* from its parent, it still includes coordinate points that come from polygons that spanned the splitting plane 404*a* in the parent mesh (i.e., the column of coordinate points along the left edge of mesh 430). Accordingly, as illustrated, some implementations treat those coordinate points at the left edge of mesh 430 as protected coordinate points 715. A portion of the unprotected coordinate points 710 can be removed from pre-simplified meshes 420' and 430' to form simplified sub-meshes 720 and 730, respectively. Notably, the simplification is performed in a manner that does not impact the polygons spanning the splitting planes 404.

The method 600 can iterate back to stage 604, where each simplified mesh from a previous iteration can be combined with its sibling simplified meshes to form a pre-simplified parent mesh according to stages 612-620 (assuming the root node has not been reached). For example, FIG. 8 shows an illustrative next iteration subsequent to the iteration illustrated by FIG. 7. As shown, previously simplified sibling meshes 720 and 730 can be combined (at stage 612) into a pre-simplified parent mesh 810. Notably, the non-inherited local splitting planes 404*b* and 404*c* of the previously simplified sibling meshes 720 and 730 are not local splitting planes of the pre-simplified parent mesh 810 (i.e., the local splitting planes are defined in a top-down manner when building the tree, as described above), and the only local splitting plane is splitting plane 404*a*. As such, a number of polygons that spanned local splitting planes in meshes 720 and 730 no longer span splitting planes in pre-simplified parent mesh 810, such that a number of previously protected coordinate points 715 are now unprotected coordinate points 710 that can be removed for simplification. The pre-simplified parent mesh 810 can be simplified (in stage 616) by removing a portion of the now-unprotected coordinate points 710 and collapsing remaining coordinate points, thereby forming a simplified parent mesh 820.

The method 600 of FIG. 6 can continue to iterate until the root node is reached, thereby simplifying the H-CLOD tree in a bottom-up fashion while preserving local (including inherited) splitting planes. FIG. 9 illustrates a simplified H-CLOD tree 900 formed by a bottom-up traversal of the tree 500 of FIGS. 5A and 5B according to iterative performance of stages 604-620 of the method 600 of FIG. 6. For example, Node 1 510*aa* and Node 2 510*ab* can be replaced by their simplified meshes 720 and 730, each having a coarser level of detail than that of their children nodes 510*ba*, 510*bb*, 510*bc*, and 510*bd*, while preserving their local Level 2 splitting planes. Similarly. Node 0 510*a* (the root node) can be replaced with the simplified mesh 820 formed from a further simplified combination of its child meshes 720 and 730, so that mesh 820 has a coarser level of detail than that of its children, while preserving its local Level 1 splitting plane.

In some embodiments, the root node mesh can be further simplified. For example, a large forest scene can be modeled in three dimensions, including large numbers of trees and plants, each modeled to a high level of detail, and all distributed over a large virtual geography. It can be desirable to zoom continuously from a virtual close-up rendering of one or more of the trees to a virtual aerial shot from high above the forest. In such an example, it can be desirable to have a large range of continuous levels of detail to support the various zoom levels.

To that end, embodiments of the method 600 can continue at stage 628 by determining whether the top-level node (initially the root node) is at a predetermined simplicity level (e.g., or a predetermined level of detail, level of complexity, etc.). If so, the method 600 can effectively end at stage 624. If not (i.e., further levels of simplification are desired), a new top-level node can be added to the tree at stage 632, such that the newly added node is a parent to the previous top-level node. Notably, the newly added node has no local splitting planes. At stage 636, the previous top-level node mesh can be further iteratively simplified by a desired amount by removing a portion of the mesh vertices (e.g., all the vertices can be considered as unprotected coordinate points 710 that are candidates for removal, as there are no splitting planes of concern). For example, a portion of the coordinate points can be removed from a portion of the faces, and edges can be collapsed to the remaining coordinate points, until the mesh complexity (e.g., face count) is reduced by at least some threshold amount (e.g., fifty percent). At stage 640, the further simplified mesh can be stored to the new top-level node.

FIG. 10 illustrates a simplified H-CLOD tree 1000 formed by further simplifying the tree 900 of FIG. 9 according to one iteration of stages 628-640 of the method 600 of FIG. 6. As shown, a new node 510x is added (at Level −1). The root node 510a mesh is further simplified without presence of any local splitting planes to form the new simplified top-level mesh 1010 at node 510x. Though only a single additional node is shown, it will be appreciated that any suitable number of nodes can be added above the top level with further simplifications of the previous top-level node.

The simplifications described above (e.g., with reference to stages 616 and 636 of FIG. 6) can be performed in any suitable manner. Some implementations can select any subset of unprotected coordinate points 710 according to mesh-agnostic types of selection criteria. For example, a predetermined percentage of unprotected coordinate points 710 can be selected arbitrarily and removed, unprotected coordinate points 710 can be removed according to a pattern (e.g., every third unprotected coordinate point 710 in the mesh), etc. Other implementations can select unprotected coordinate points 710 to remove using an impact metric. For example, for each (e.g., some or all) unprotected coordinate point 710, a line segment can be generated between the location of the point and a location at which the point would be projected onto a simplified surface formed by removing the point (i.e., subsequent to collapsing one or more edges that connected the point with other points on the surface). The length of the line segment can be considered as a measure of impact (or error) to the surface from removal of the point. A determination can be made as to which unprotected coordinate points 710 could be removed with the least impact to the surface. For example, the resulting line segments can be sorted by length. A certain portion (e.g., percentage, number, etc.) of the unprotected coordinate points 710 having the lowest determined impact (e.g., the smallest line segment lengths) can be removed. Other techniques can be used to determine which coordinate points to select for removal.

Referring back to FIG. 1, embodiments of the H-CLOD generator 140 can receive the raw mesh data 112 from the modeling system 110. The H-CLOD generator 140 can then build an un-simplified H-CLOD tree data structure by iteratively splitting the meshes and passing down splitting planes (e.g., according to techniques described with reference to FIGS. 3-5B). The H-CLOD generator 140 can then simplify the meshes stored in the nodes of the H-CLOD tree data structure using an iterative bottom-up traversal of the tree that uses local splitting planes to prevent simplifications from affecting sub-mesh boundaries (e.g., according to techniques described with reference to FIGS. 6-10). The simplified H-CLOD tree (i.e., the H-CLOD tree data structure with progressively simplified pre-computed meshes) can be output by the H-CLOD generator 140 as the H-CLOD mesh data 145. Embodiments of the renderer 150 can traverse the H-CLOD mesh data 145 according to virtual camera data 114 received from the modeling system 110 to determine which nodes of the H-CLOD tree to render.

For example, the H-CLOD mesh data 145 represents an object's mesh as a hierarchical tree data structure having a finest level of detail at its leaf nodes and a coarsest level of detail at its top-most node. For the sake of illustration, FIGS. 11A-11F show six different traversal options for an illustrative H-CLOD tree 1100 having four levels. The illustrative H-CLOD tree 1100 can, for example, represent the tree 1000 of FIG. 10. In each of FIGS. 11A-11F, the filled in nodes represent the active front nodes, those nodes selected for rendering of the mesh. FIG. 11A shows a traversal that results in a lowest level of detail rendering (e.g., "Level −1" of FIG. 10), as only the coarsest representation of the mesh is part of the active front. FIG. 11B shows a traversal that results in rendering only the root node (e.g., "Level 0" of FIG. 10, the coarsest level of detail formed from the bottom-up simplification of the H-CLOD tree prior to adding further top-level nodes above the root). The resulting level of detail is higher than in FIG. 11A, but still lower than all of FIGS. 11C-11F. FIG. 11C shows a traversal that results in rendering the children of the root node (e.g., "Level 1" of FIG. 10). The resulting level of detail is higher than in FIGS. 11A and 11B, but still lower than all of FIGS. 11D-11F. FIGS. 11D and E each shows a traversal that results in rendering a child of the root node (e.g., "Level 1" of FIG. 10) on one branch of the tree and the leaf nodes (e.g., "Level 2" of FIG. 10) on the other branch of the tree. The resulting level of detail is higher than in FIGS. 11A-11C, but still lower than in FIG. 11F. Finally, FIG. 11F shows a traversal that results in a highest level of detail rendering by rendering all the leaf nodes (e.g., "Level 2" of FIG. 10) as the active front.

Figure 12:
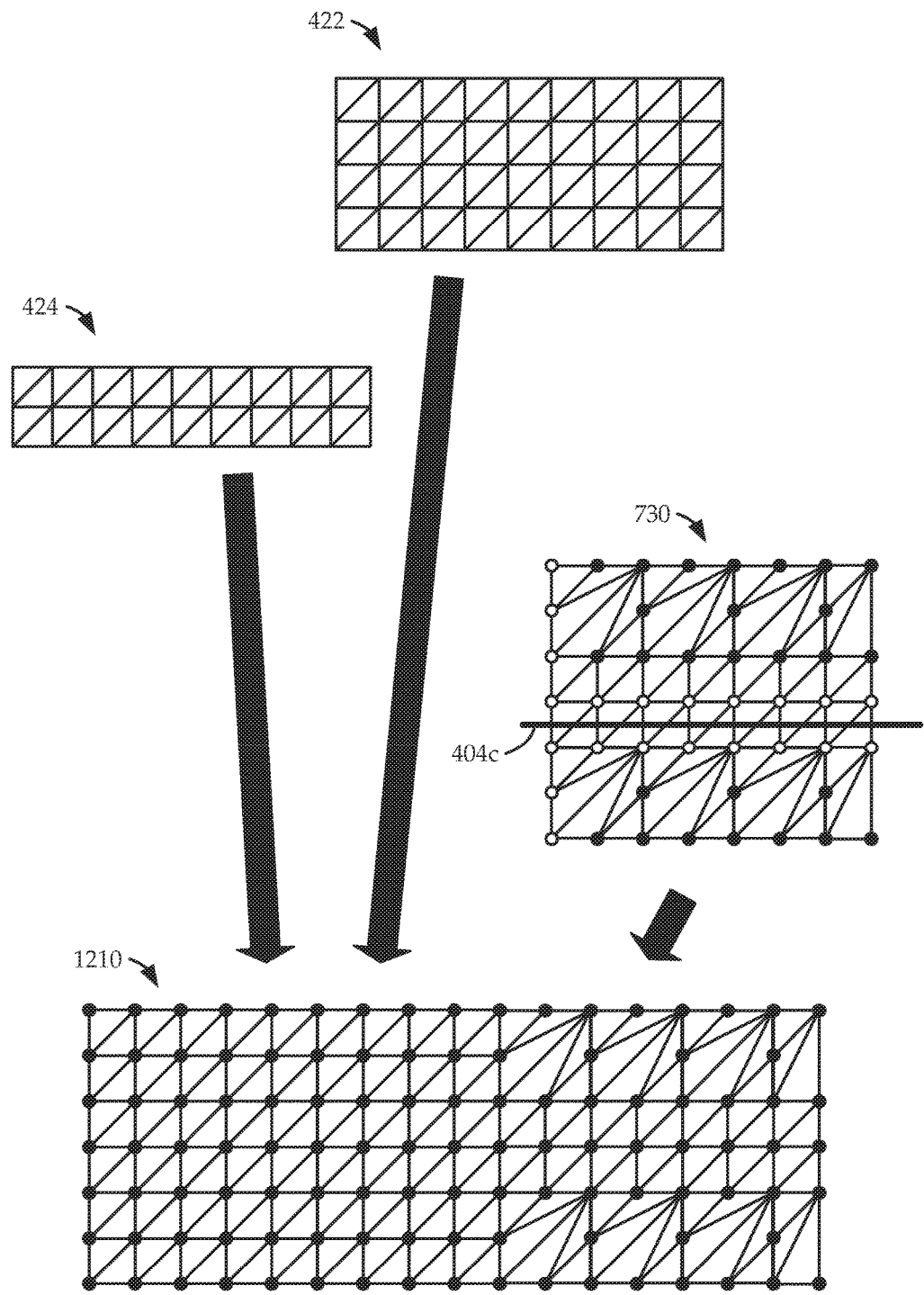
FIG. 12 shows an example of a level of detail rendering using different levels of traversal in different branches of an H-CLOD tree.

As a further illustration, FIG. 12 shows an example of a level of detail rendering using different levels of traversal in different branches of an H-CLOD tree. The rendering of FIG. 12 uses meshes described above in context of FIGS. 7-10, including meshes from Node 3 510ba, Node 4 510bb, and Node 2 510ab (e.g., similar to the type of traversal illustrated by FIG. 11D or 11E). For example, it can be assumed that the left side of the object represented by the mesh (i.e., the branch of the tree originating at Node 1 510aa) is closer than the right side (i.e., the branch of the tree originating at Node 2 510ab) to a virtual camera position, so that it is desirable to render the left side of the mesh with a finer level of detail than that of the right. Accordingly, the left branch is traversed to leaf nodes 510ba and 510bb, and meshes 422 and 424 (the finest level of detail) are included in the active front for rendering. In the right branch, and simplified mesh 730 from node 510ab is included in the active front for rendering. The three nodes are combined to form the active front mesh 1210, which has different levels of detail in its left and right portions, accordingly.

Embodiments can use various techniques to determine which nodes to include in the active front for rendering. Some embodiments make the determination according to a measure of error introduced between each successive simplification in level of detail. The error can be adapted to a virtual camera position for a particular rendering frame (e.g., according to the virtual camera data 114), so that appropriate levels of detail can be determine to fall within a tolerable amount of error for each sub-mesh in accordance with the sub-mesh's position relative to the virtual camera.

Figure 13:
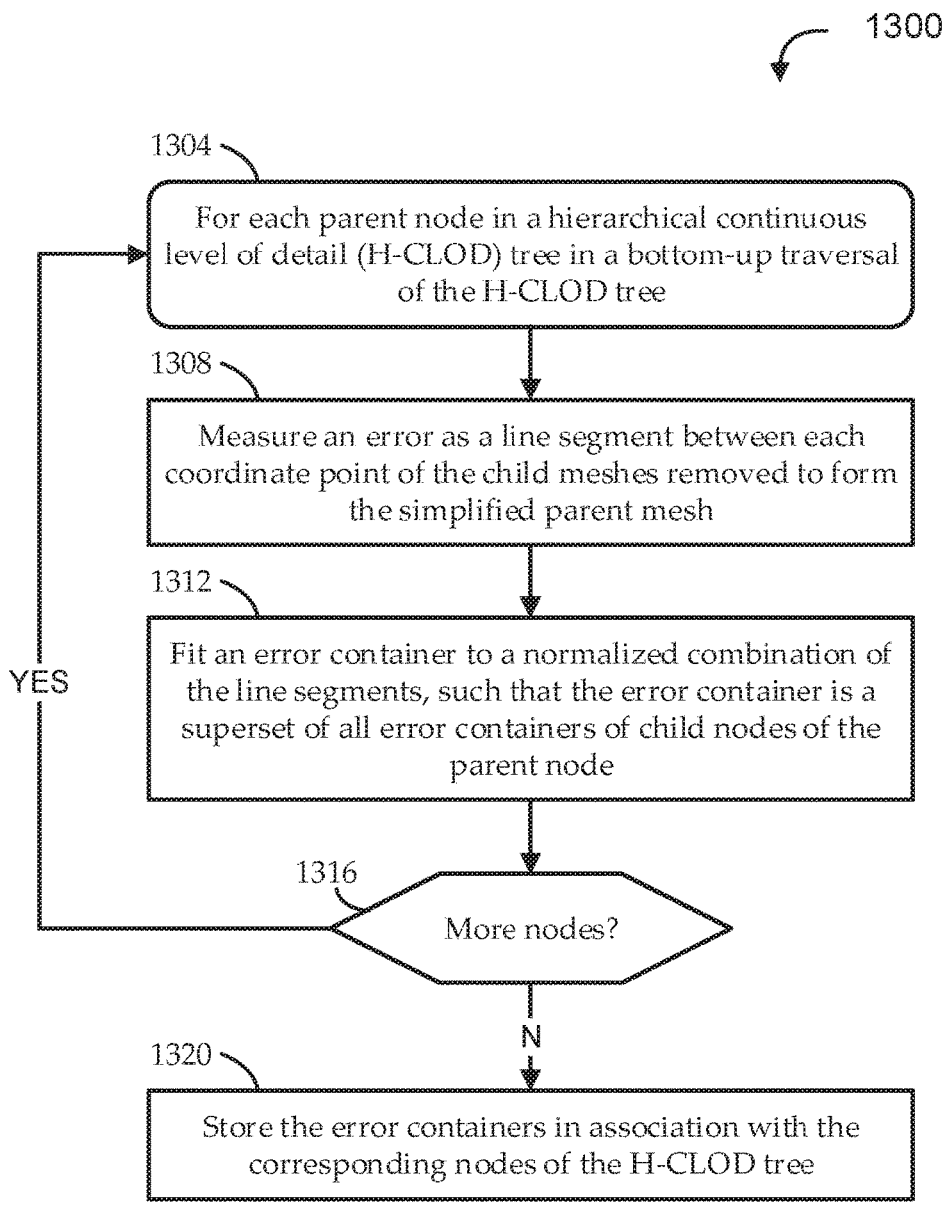
FIG. 13 shows a flow diagram of an illustrative method for measuring error introduced between each successive simplification in level of detail in an H-CLOD tree, according to some embodiments.

FIG. 13 shows a flow diagram of an illustrative method 1300 for measuring error introduced between each successive simplification in level of detail in an H-CLOD tree, according to some embodiments. In some implementations, the method 1300 is performed in parallel with simplification of the H-CLOD tree (e.g., according to the method 600 of FIG. 6). In other implementations, the method 1300 can be performed at any suitable time (e.g., after the H-CLOD mesh data 145 is generated and before rendering). Embodiments begin at stage 1304 by starting an iteration of the method 1300 for each parent node of an H-CLOD tree, according to a bottom-up traversal (e.g., starting at the parents of the leaf nodes, assuming the leaf nodes to represent portions of the raw mesh without any introduced simplification error).

Figure 14:
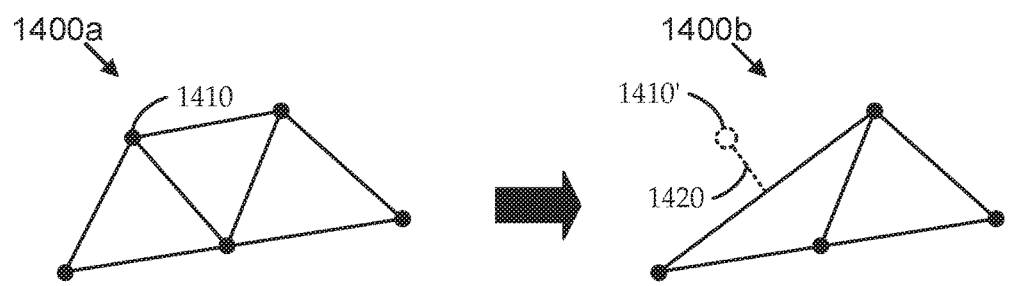
FIG. 14 shows a simplified change to a surface caused by a removal of a coordinate point and a resulting error vector (line segment)

The method 1300 evaluates "error" by looking effectively at a difference between a surface at one level of detail and the surface at an adjacent level of detail (i.e., the parent or child representation of the mesh in the H-CLOD tree). At stage 1308, an error can be measured as a line segment between each coordinate point removed from the child meshes to generate the simplified (or pre-simplified) parent mesh. For the sake of illustration, FIG. 14 shows a simplified change to a surface caused by a removal of a coordinate point and a resulting error line segment. A finer level of detail version of the mesh 1400a is shown to the left, having a number of coordinate points connected by edges. As illustrated, mesh 1400a can be simplified into a coarser level of detail version of the mesh 1400b (shown on the right) by removing one of the coordinate points 1410 from mesh 1400a and collapsing the edges to the remaining coordinate points. The "error" (i.e., impact) from the simplification can be measured as a line segment between the removed coordinate point 1400a' and the simplified surface represented by mesh 1400b. For example, the line segment is oriented normal to the simplified mesh 1400b, and the magnitude of the line segment is a measurement of the error introduced by removing the associated coordinate point 1400a'.

Returning to FIG. 13, at stage 1312, an error container can be fit to a group of line segments. For example, the line segments can be repositioned to have a common origin point. In some implementations, only a subset of the line segments are used in stage 1312. For example, the error magnitudes can be sorted, and only a predetermined percentage of the most impactful line segments can be used; all segments can be used, except for a certain percentage with the most and least impact; only segments within a certain predetermined number of standard deviations from the mean can be used (e.g., discarding outliers); etc. A 3D volume of predetermined shape (e.g., a cylinder) can then be fit to the line segments as an error container (i.e., in effect, the volume represents a total 3D impact of a mesh simplification as an amount of impacted space relative to the mesh). In some embodiments, the error container can be a superset of all error containers of child nodes of the parent node. For example, the error container can represent the error between a particular level of detail and an adjacent level of detail, or the error container can represent a total error associated with a particular level of detail as compared to the raw (un-simplified) mesh.

Stages 1308 and 1312 can iterate for all parent nodes in the H-CLOD tree. For example, at stage 1316, a determination can be made as to whether additional nodes remain for error evaluation. If so, the method 1300 can iterate back to stage 1304 to effectively select a next parent node for evaluation. If not, at stage 1320, the error containers can be stored in association with their corresponding nodes of the H-CLOD tree. In some embodiments, storing the error containers at stage 1320 can be performed in each iteration after stage 1312, or at any other suitable time. Further, the error containers can be stored in the H-CLOD tree data structure or in other storage associated with (e.g., pointing to, etc.) the H-CLOD tree. Subsequent to performance of the method 1300, each node of the H-CLOD tree (except for the leaf nodes) can have an associated, pre-computed error container indicating an error associated with that particular level of detail.

Notably, measuring error in this way effectively scales the error to the 3D space of concern. For example, the error magnitudes can be computed in the same reference coordinate system in which the mesh is modeled, such that the error is expressed in a way that is comparable to sizes of faces (e.g., lengths of edges, etc.) and/or other 3D scene measurements. As such, a small change to a very large object in the scene may yield a much larger error than that of a proportionally similar change to a very small object in the scene; which can more closely indicate the impact of that error to a viewer after rendering. Further, measuring error in terms of its 3D spatial context can facilitate use of the error in dynamic selection of level of detail. For example, the viewing impact of scene objects can change from frame to frame due to relative changes in position between those objects and a virtual camera. For example, some objects in a scene may be animated to move with respect to other objects; portions of an object may move with respect to other portions of the object; a virtual camera may change its position with respect to the scene (e.g., change its location, orientation, zoom level, etc.); etc. As described below, embodiments can evaluate the viewing impacts of these changes by using screen space projections of the error containers.

Figure 16:
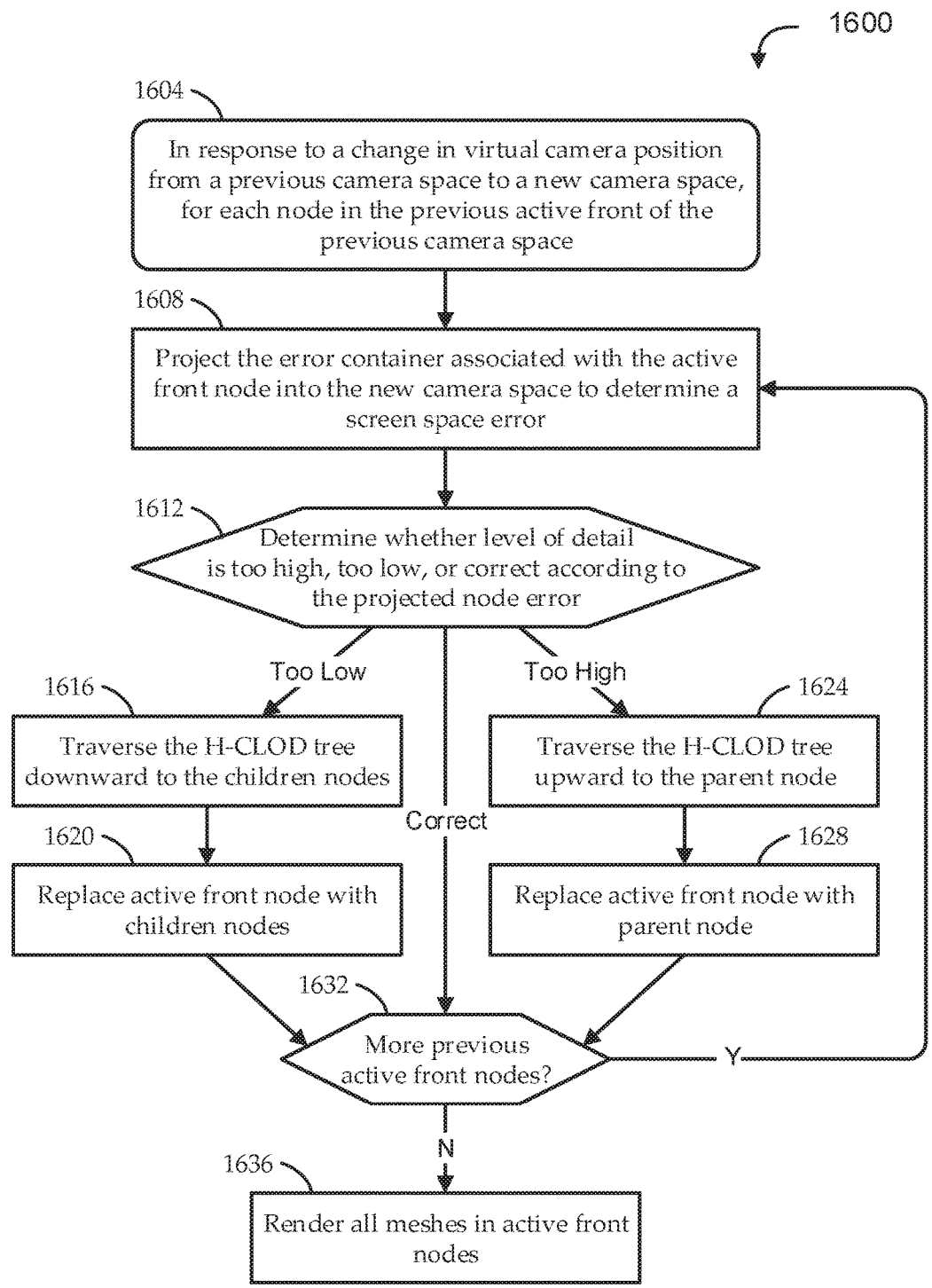
FIG. 16 shows a flow diagram of an illustrative method for determining which nodes to render in a particular frame, according to various embodiments.

As described above, rendering in the context of H-CLOD trees can involve traversing the tree to determine which nodes to use as the active front for rendering, and that determination can be made based on a predetermined acceptable amount of viewing error. FIG. 16 shows a flow diagram of an illustrative method 1600 for determining which nodes to render in a particular frame, according to various embodiments. In general, embodiments of the method 1600 iterate through all nodes presently in the active front (according to a virtual camera position of a preceding frame) to determine, for each active front node, whether to continue using that node, or whether to replace that node in the active front with its parent (for lower level of detail) node or children nodes (for higher level of detail). Embodiments can begin at stage 1604, in response to a change in virtual camera position relative to an object in a scene (e.g., or at each frame, regardless of any change), to iterate for all present active front nodes. For example, in a previous frame, the virtual camera was positioned in a previous camera space that drove selection of a particular set of previous active front nodes to render. In the present frame, the virtual camera is positioned in a new camera space, and the method 1600 seeks to determine whether any of the previous active front nodes should be replaced.

Figure 15A:
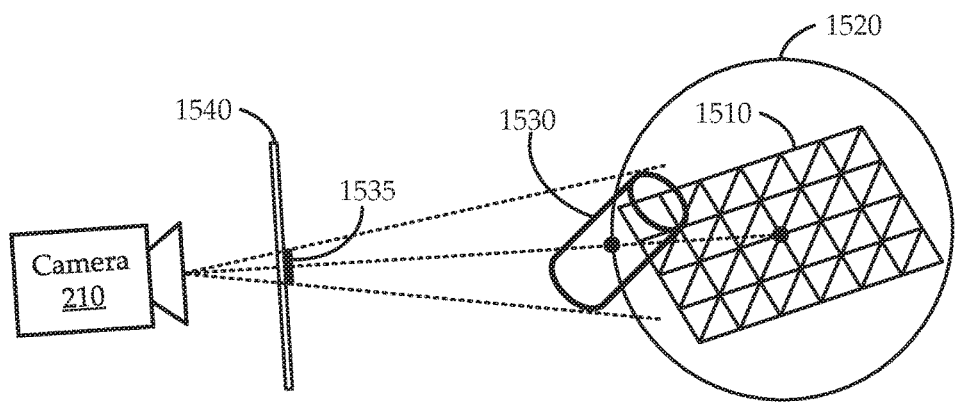
FIGS. 15A and 15B show two approaches to an illustrative screen space projection of an error container with respect to a virtual camera position.
Figure 15B:
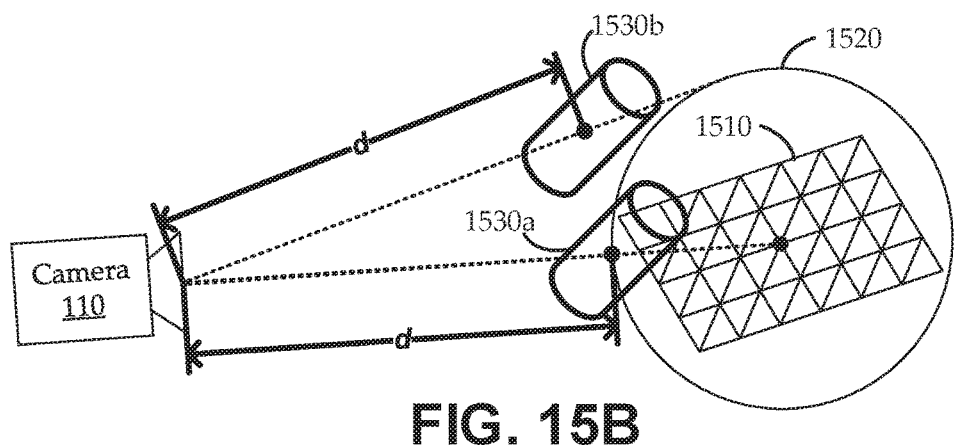

Each iteration can effectively begin at stage 1608 for a selected one of the previous active front nodes. At stage 1608, an error container associated with the selected previous active front node can be projected into a new screen space defined by the new camera space to produce a screen space error. For the sake of illustration, FIGS. 15A and 15B show two approaches to an illustrative screen space projection of an error container 1530 with respect to a virtual camera 210 position. A simple mesh 1510 is shown, which can be a particular level of detail representation of the mesh associated with a particular node of an H-CLOD tree. As described above, the error container 1530 represents a position independent simplification of all the errors at the particular level of detail associated with the mesh 1510. As further described above, rendering can involve projecting the 3D modeled environment into a 2D image space. The rendering in the 2D space can be what is displayed to a viewer (e.g., by display system 170 of FIG. 1), and can be referred to as the "screen space," accordingly. The screen space (represented in FIG. 15A as screen space 1540) can be defined by the position of the virtual camera 210. For example, a line can be drawn from the virtual camera to a center point of the mesh 1510, and the screen space 1540 can be a plane (e.g., orthogonal to the line) and positioned at a focal distance of the virtual camera 210 (or at any other suitable position).

As illustrated in FIG. 15A, the error container 1530 can then be projected into screen space 1540 to produce a screen space projection 1535. A screen space error can be measured from the screen space projection 1535 in accordance with dimensions (e.g., 2D) of the error container 1530 as projected in screen space 1540. For example, the screen space error can be measured as a number of pixels occupied by the screen space projection 1535, a height and width (or area) of the screen space projection 1535, etc. Some embodiments seek to ensure that the screen space error is determined in a conservative manner. For example, some embodiments compute a bounding sphere 1520 around the mesh (e.g., centered on the center point of the mesh) and locate the error container 1530 (e.g., a center of the container, an origin point of the line segments bound by the container, etc.) at a point on the bounding sphere 1520 that is closest to the virtual camera 210 (or to the screen space 1540). Alternatively, embodiments can determine a point on the mesh 1510 closest to the virtual camera 210 or screen space 1540 for locating the error container 1530.

Some embodiments can provide further assurance that the screen space error is measured conservatively. As shown in FIG. 15B, two instances of the error container 1530 can be separately positioned. For example, a first instance of the error container 1530a can be positioned as in FIG. 15A, thereby defining a projection distance, "d" (e.g., the distance between the virtual camera 210 and the point on the bounding sphere 1520 closest to the virtual camera 210). A second line can be drawn from the virtual camera 210 to an edge of the bounding sphere 1520, and a second instance of the error container 1530b can be positioned on that second line at the same projection distance (d) from the virtual camera. Both instances of the error container 1530 can be projected into screen space 1540, forming respective screen space projections 1535, which can have different respective sizes. The screen space error can be computed as the larger of the screen space projections 1535 (or the average, etc.).

Returning to FIG. 16, at stage 1612, a determination can be made as to whether a higher or lower level of detail is desired according to the screen space error computed in stage 1608. For example, the screen space error can be compared against one or more error thresholds. If it is determined at stage 1612 that the screen space error for the new camera space exceeds the threshold (e.g., by a certain amount, or exceeds a second threshold) embodiments can use a higher level of detail for rendering. For example, embodiments can traverse the H-CLOD tree to the children nodes of the previous active front node at stage 1616, and can replace the previous active front node with the children nodes at stage 1620. If it is determined at stage 1612 that the screen space error for the new camera space falls below the threshold (e.g., by a certain amount, or falls below a third threshold), embodiments can use a lower level of detail for rendering. For example, embodiments can traverse the H-CLOD tree to the parent node of the previous active front node at stage 1624, and can replace the previous active front node with its parent node at stage 1628. If it is determined at stage 1612 that the screen space error for the new camera space is below, but close to, the threshold (e.g., within a predetermined error band), embodiments can effectively maintain the previous level of detail by keeping the previous active front node in the new active front. Notably, evaluating error in this way can provide a number of features. For example, use of projected screen space error can permit the error to be orientable, such that the error can be determined in a manner that is view-dependent (e.g., changes with relative changes in the virtual camera position). Further, selection of active nodes according to screen space error can help maintain (e.g., avoid artifacts at) the silhouette edges of the rendered objects.

Embodiments of the method 1600 can continue to iterate until all active front nodes are appropriately selected. For example, at stage 1632, a determination can be made as to whether more active front nodes remain to be evaluated. If so, the method 1600 can iterate back to stage 1608. In some embodiments, a replaced active node can be re-evaluated in a subsequent iteration. For example, some implementations can permit changing level of detail by more than one level between frames by using multiple iterations to determine an appropriate level of detail for a particular active front node (e.g., if relative positions of the object and/or virtual camera change abruptly and significantly, it may be desirable to have a large change in level of detail). However, such techniques can typically be applied in contexts where continuous changes in level of detail are desired. Further, some implementations of the method may not iterate through all the previous active front nodes. For example, when a previous active front node is replaced by a parent (i.e., for coarser level of detail), some embodiments do not evaluate the siblings of that previous active front node.

Having determined which nodes are in the active front, embodiments can render all the active front nodes at stage 1636. For example, all the active front nodes can be combined to form the mesh to be rendered. As shown in FIG. 1, the H-CLOD mesh data 145 associated with the active front nodes, virtual camera data 114 (e.g., used by method 1600 to determine which active front nodes to use), and other model data (e.g., texture data 116, lighting data, etc.), can be used by the renderer 150 of the graphics processing system 130 to generate rendered output 160. The rendered output 160 can then be displayed by the display system 170.

Notably, as described above, the H-CLOD mesh data 145 can be pre-computed, so that the renderer 150 can operate without runtime computation of mesh representations for different levels of detail, error containers, etc. Instead, at runtime, embodiments can construct each new active front for rendering by examining only the previous active front nodes of the H-CLOD tree (i.e., without traversing the entire tree) to determine whether to replace those nodes with other (e.g., parent or child) nodes in the tree according to updated screen space error projections. Constructing the active front in this way can appreciably reduce the runtime burden on the graphics processing system 130 (e.g., on a GPU, or the like).

Such a construction provides a number of additional features. One such feature is that lighting fidelity can be independent of mesh level of detail. For example, the renderer 130 can implement lighting with a lighting normal map from the highest detail mesh (e.g. as modeled), regardless of the level of detail selected for the active front. Another such feature is that the H-CLOD tree structure can permit trivial rejection of "not visible" nodes. For example, because branches of the tree correspond to sub-meshes, determination that a particular node is "off-screen" (e.g., not in the viewing area of the virtual camera) or "back-facing" (e.g., having all face normals directed away from the virtual camera) is effectively a determination that all the children of that node are also off-screen or back-facing. Accordingly, all the children can be culled (e.g., rejected, ignored, or otherwise not involved in runtime functions of the renderer 150). In some implementations, a cone (or other suitable volume) can be used to contain all normals of faces included in a particular node's mesh (e.g., and all the meshes of its children). By checking the orientation of the cone relative to the virtual camera, a determination can be made as to whether a particular node (and its children) is back-facing and can be culled.

Yet another such feature is that techniques described can be applied to skeletal types of meshes. Some modeling environments permit animated models (e.g., humans, animals, etc.) to be constructed as sub-models with defined couplings, generally referred to herein as "skeletal." For example, a human can be modeled as skeleton having "bones" connected by "joints," and sub-meshes can be constructed as a "skin" over each "bone." As such a model is animated, each of its component sub-mesh can move relative to others of its sub-meshes in dynamic ways (e.g., each frame of animated movement of a human model can include changes in head position, arm positions, leg positions, etc.). Some embodiments can use the joint locations as splitting planes for building the H-CLOD tree data structure. Further splitting planes can then be used in substantially the same manner described above. With skeletal and other complex sub-mesh relationships, using those relationships to define splitting planes can result in more than two children for a particular node in the H-CLOD tree. Further, complex sub-mesh relationships can permit relative repositioning of sub-meshes with respect to each other. Accordingly, some embodiments permit the error containers to effectively animate along with the sub-mesh positions, so that screen space errors can be computed in a manner that accounts for both the virtual camera position and the animated sub-mesh positions.

Still another such feature is that the H-CLOD tree can be highly scalable. As described above, the mesh can be simplified beyond that of the root node by adding (e.g., iteratively) further top-level nodes for coarser levels of detail. Additionally or alternatively, one or more levels of the H-CLOD tree can be removed. For example, leaf nodes can be removed from the H-CLOD tree to effectively remove the finest level of detail. Such approaches can be useful, for example, in contexts with limited rendering resources, limited display capability, and/or other limitations. For example, when rendering on a mobile device versus on a high-definition gaming console, the mobile device may have a less capable graphics processor, a smaller screen, etc. Accordingly, only a portion of the H-CLOD tree may be needed to provide a full range of usable levels of detail in the mobile device environment.

The above features and embodiments can also be applied in context of a tessellation engine. For example, embodiments of the H-CLOD functionality can be implemented directly in front of a tesselation engine. Such embodiments can assign lower (or no) levels of tessellation to sections farther away from a virtual camera, and higher levels of tesselation levels to sections closer to the virtual camera. As described above, this can effectively allow continuous level of detail and tesselation levels to be applied, while accounting for screen space error and silhouette edges. Such an approach can greatly reduce the amount of tesselation (and related resources) involved in achieving the same visual quality with conventional approaches. Further, as described above, such approaches can exploit additional features, such as trivially rejecting sections that are off-screen or back-facing, so they are not sent to the tesselation engine; and/or tuning screen space error at runtime to permit adjusting detail level on-the-fly.

The methods described above can be implemented using any of the systems described above and/or other system implementations; and the systems described above can implement methods other than those described above. Further, some of the functions of the methods and systems described herein can be implemented in one or more computational environments.

Figure 17:
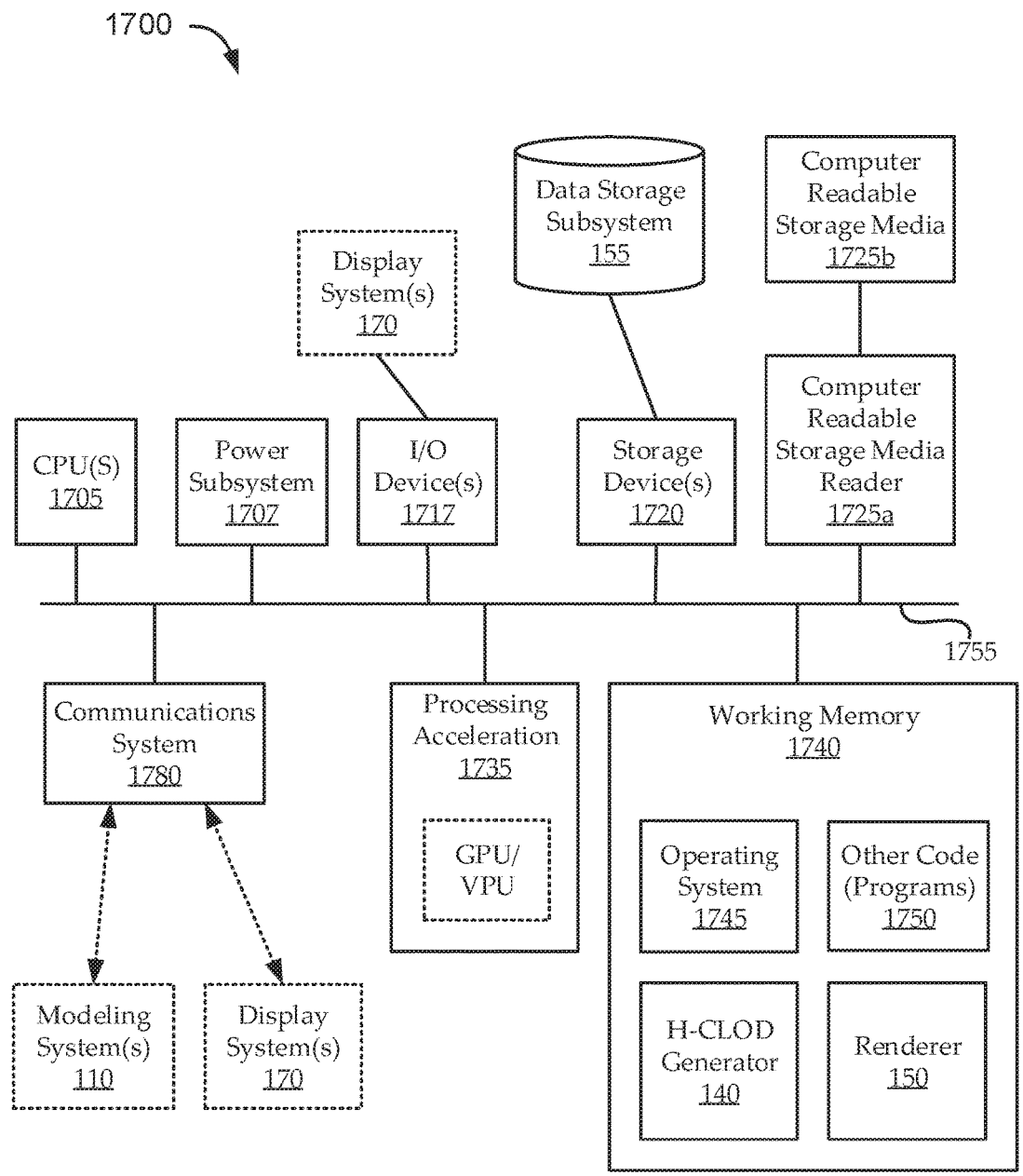
FIG. 17 shows an exemplary computational environment for implementing hierarchical continuous level of detail (H-CLOD) techniques described herein, according to various embodiments.

FIG. 17 shows an exemplary computational environment 1700 for implementing hierarchical continuous level of detail (H-CLOD) techniques described herein, according to various embodiments. For example, the computational environment 1700 can be an implementation of some or all of a rendering system 120. The computational environment 1700 can be implemented as or embodied in single computer systems, distributed computer systems, or in any other useful way. The computational environment 1700 is shown including hardware elements that may be electrically coupled via a bus 1755.

The hardware elements may include one or more central processing units (CPUs) and/or other processor(s) 1705. In some embodiments, the computational environment 1700 can also include a processing acceleration unit 1735, which can include a graphics processing unit (GPU), visual processing unit (VPU), digital signal processor (DSP), special-purpose processor, and/or the like. In some implementations, the processing acceleration unit 1735 includes one or more types of acceleration software.

Implementations can also include one or more input/output devices 1710. For example, the input/output devices 1710 can include, and/or be in communication with one or more display subsystems 170, user interface devices (e.g., keyboards), etc. Some implementations also include a power subsystem 1707, including any suitable power storage, power electronics, power interfaces, etc. Some implementations can permit data to be exchanged, via a communications subsystem 1780, with one or more networks and/or any other computer or external system. The communications subsystem 1780 can include a modem, a network card (wireless or wired), an infrared communication device, and/or any other suitable components or combinations thereof. In some implementations, the communications subsystem 1780 permits communications between the computational environment 1700 and modeling subsystem(s) 110, display subsystem(s) 170, etc. Some implementations use the communications subsystem 1780 to facilitate distributed processing over multiple computational environments. In alternative environments, one or more modeling subsystem (s) 110, display subsystem(s) 170, etc. are part of the computational environment 1700.

The computational environment 1700 can also include one or more storage devices 1720. By way of example, storage device(s) 1720 may be disk drives, optical storage devices, solid-state storage device such as a random access memory (RAM) and/or a read-only memory (ROM), which can be programmable, flash-updateable and/or the like. The computational environment 1700 can additionally include a computer-readable storage media reader 1725a, and working memory 1740, which may include RAM and ROM devices as described above. The computer-readable storage media reader 1725a can further be connected to a computer-readable storage medium 1725b, together (and, optionally, in combination with storage device(s) 1720) comprehensively representing remote, local, fixed, and/or removable storage devices plus storage media for temporarily and/or more permanently containing computer-readable information. The storage device(s) 1720, computer-readable storage media and media reader 1725, and/or working memory 1740 can be used to implement one or more (e.g., all) of the data stores of the data storage subsystem 155 (e.g., raw mesh data 112, virtual camera data 114, texture data 116, H-CLOD mesh data 145, and rendered output data 160).

In some embodiments, the computational environment 1700 can also include software elements, shown as being currently located within a working memory 1740, including an operating system 1745 and/or other code 1750, such as an application program (which may be a client application, web browser, mid-tier application, etc.). For example, embodiments can be implemented as instructions, which, when executed by one or more processors 1705, cause the processors 1705 to perform certain functions. Such functions can include functionality of the H-CLOD generator 140 and/or renderer 150, for example, as described above.

A software module can be a single instruction, or many instructions, and can be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Alternate embodiments of a computational environment 1700 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 1700 may include code 1750 for implementing embodiments as described herein. For example, while not shown as part of the working memory 1740, certain functionality of other subsystems can be implemented with any suitable combination of hardware and software, including using code 1750 stored in the working memory 1740.

The methods disclosed herein include one or more actions for achieving the described method. The method and/or actions may be interchanged with one another without departing from the scope of the claims. In other words, unless a specific order of actions is specified, the order and/or use of specific actions may be modified without departing from the scope of the claims.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for generating a hierarchical continuous level of detail (H-CLOD) tree data structure for three-dimensional (3D) model rendering, the method comprising:
   storing a raw 3D mesh of the 3D model to a root node of an unsimplified tree data structure;
   iteratively adding nodes to the unsimplified tree data structure from the raw 3D mesh by, for each lowest-level node of the tree data structure, until each lowest-level node has an associated mesh that is smaller than a predetermined bucket size:
      partitioning the candidate mesh according to a candidate splitting plane determined for the lowest-level node to generate at least two child meshes;
      storing the candidate splitting plane to the set of local splitting planes; and
      storing each of the at least two child meshes to a respective child node added to the lowest-level node, such that each child node becomes a lowest-level node in a respective branch of the unsimplified tree data structure; and
   iteratively generating an H-CLOD tree data structure from the unsimplified tree data structure by, for each non-leaf child node of the unsimplified tree data structure:
      combining all meshes stored by children nodes of the non-leaf child node to form a pre-simplified mesh; and
      computing a simplified mesh from the pre-simplified mesh by removing a portion of 3D coordinate points only from polygons of the pre-simplified mesh that do not span any of the set of local splitting planes associated with the non-leaf child node.

2. The method of claim 1, wherein the iteratively adding nodes further comprises:
storing a parent splitting plane to the set of local splitting planes associated with the lowest-level node when the lowest-level node was produced by splitting a mesh of parent node in the tree data structure according to the parent splitting plane.

3. The method of claim 1, wherein the iteratively adding nodes further comprises:
determining the candidate splitting plane for the lowest-level node, such that the generated at least two child meshes have similar face counts.

4. The method of claim 1, wherein the iteratively adding nodes further comprises:
determining the candidate splitting plane for the lowest-level node in at least one iteration according to a longest axis of the candidate mesh.

5. The method of claim 1, wherein the raw 3D mesh is a skeletal mesh having skeletal sub-meshes coupled by joints, and the iteratively adding nodes further comprises:
determining the candidate splitting plane for the lowest-level node in at least one iteration according to the joints.

6. The method of claim 1, wherein computing the simplified mesh comprises:
determining a set of unprotected coordinate points of the pre-simplified mesh as the coordinate points of the pre-simplified mesh that are not part of any polygons of the pre-simplified mesh that span any of the set of local splitting planes associated with the non-leaf child node, wherein the removed portion of 3D coordinate points is a subset of the set of unprotected coordinate points.

7. The method of claim 6, wherein computing the simplified mesh further comprises:
computing, for each unprotected coordinate point of the pre-simplified mesh, an impact magnitude corresponding to a length of a normal vector drawn between the unprotected coordinate point and a simplified surface produced by removing the unprotected coordinate point from the pre-simplified mesh; and
determining the removed portion of 3D coordinates by determining the subset of the set of unprotected coordinate points having lowest respective impact magnitudes.

8. The method of claim 1, further comprising:
first rendering a first continuous level of detail (CLOD) representation of the 3D model by rendering an active front comprising a selected subset of the nodes of the H-CLOD tree data structure that combine to form the CLOD representation, the subset of the nodes selected according to a virtual camera position relative to the 3D model.

9. The method of claim 8, further comprising:
determining an updated virtual camera position subsequent to the first rendering;
determining, for each of at least a subset of the nodes in the active front, according to the updated virtual camera position, whether to increase a level of detail associated with the node or to decrease the level of detail associated with the node;
updating the active front by, for each of at least the subset of the nodes in the active front, replacing the node in the active front with its children nodes if it is determined to decrease the level of detail associated with the node, and replacing the node in the active front with its parent node if it is determined to decrease the level of detail associated with the node; and
second rendering a second CLOD representation of the 3D model by rendering the updated active front.

10. The method of claim 9, wherein determining, for each of at least a subset of the nodes in the active front, according to the updated virtual camera position, whether to increase the level of detail associated with the node or to decrease the level of detail associated with the node comprises:
computing a screen space error for the node by projecting an error container associated with the node to a screen space defined according to the updated virtual camera position;
determining to increase the level of detail associated with the node when the screen space error for the node in the updated virtual camera position exceeds a first predetermined threshold; and
determining to decrease the level of detail associated with the node when the screen space error for the node in the updated virtual camera position falls below a second predetermined threshold.

11. The method of claim 10, further comprising:
computing an error container for the node by;
generating, for each of at least a subset of the 3D coordinate points removed from the pre-simplified mesh to compute the simplified mesh stored by the node, a line segment from the removed 3D coordinate point to the simplified mesh;
translating the line segments to a common origin; and
fitting the error container to the translated line segments.

12. The method of claim 1, further comprising:
computing a simplified sub-root mesh from a root mesh by removing a portion of 3D coordinate points from the root mesh, the root mesh stored by the root node of the H-CLOD tree data structure subsequent to the iteratively generating; and
storing the sub-root mesh to a sub-root node added to the H-CLOD tree data structure as a parent to the root node.

13. The method of claim 1, wherein:
the raw 3D mesh is constructed by tessellating the 3D model to form a plurality of polygons defined by 3D coordinate points connected by edges;
each generated child mesh comprises a subset of the 3D coordinate points; and
each node of the H-CLOD tree data structure stores its respective mesh as a plurality of indices, each index corresponding to a 3D coordinate point of the respective mesh.

14. The method of claim 1, wherein the raw 3D mesh is an arbitrary mesh.

15. A three-dimensional (3D) model rendering system using hierarchical continuous level of detail (H-CLOD), the system comprising:
a data storage subsystem comprising:
a raw mesh store having raw 3D mesh data stored thereon, the raw 3D mesh data constructed by tessellating a 3D model to generated a plurality of polygons defined by 3D coordinate points connected by edges; and
an H-CLOD data store having an H-CLOD tree data structure comprising a plurality of hierarchically arranged nodes, each node storing a mesh representation of a portion of the raw 3D mesh data at a respective level of detail;

an H-CLOD generator comprising:
a raw mesh input in communication with the raw mesh store; and
an H-CLOD output in communication with the H-CLOD data store,
wherein the H-CLOD data store receives the mesh representations via the H-CLOD output, such that the mesh representation of each child node corresponds to a sub-mesh split from a parent mesh according to a parent splitting plane, and such that the mesh representation of each parent node is a combination of the mesh representations of its children nodes simplified only in regions not touching the parent splitting plane.

16. The 3D model rendering system of claim 15, wherein the H-CLOD generator further comprises:
a tree constructor that generates a tree data structure by:
storing a raw 3D mesh of the 3D model to a root node of an unsimplified tree data structure; and
iteratively adding nodes to the unsimplified tree data structure from the raw 3D mesh by, for each lowest-level node of the tree data structure, until each lowest-level node has an associated mesh that is smaller than a predetermined bucket size:
splitting the candidate mesh according to a candidate splitting plane determined for the lowest-level node to generate at least two child meshes;
storing the candidate splitting plane to the set of local splitting planes; and
storing each of the at least two child meshes to a respective child node added to the lowest-level node, such that each child node becomes a lowest-level node in a respective branch of the unsimplified tree data structure,
wherein the mesh representations are generated for each node of the H-CLOD tree data structure from the respective meshes of corresponding nodes of the unsimplified tree data structure.

17. The 3D model rendering system of claim 16, wherein the mesh representations are generated for each node of the H-CLOD tree data structure from the respective meshes of corresponding nodes of the unsimplified tree data structure by, for each non-leaf child node of the unsimplified tree data structure:
combining all meshes stored by children nodes of the non-leaf child node to form a pre-simplified mesh; and
computing a simplified mesh from the pre-simplified mesh by removing a portion of 3D coordinate points only from polygons of the pre-simplified mesh that do not span any of the set of local splitting planes associated with the non-leaf child node.

18. The 3D model rendering system of claim 15, further comprising:
a renderer comprising:
an H-CLOD input in communication with the H-CLOD data store; and
a rendered data output in communication with a rendered data store of the storage subsystem,
wherein the rendered data output comprises a first continuous level of detail (CLOD) representation of the 3D model, output by the renderer according to rendering an active front comprising a selected subset of the nodes of the H-CLOD tree data structure that combine to form the CLOD representation, the subset of the nodes selected according to a virtual camera position relative to the 3D model.

19. The 3D model rendering system of claim 18, wherein the rendered data output further comprises a second CLOD representation of the 3D model output by the renderer according to:
determining an updated virtual camera position subsequent to the first rendering;
determining, for each of at least a subset of the nodes in the active front, according to the updated virtual camera position, whether to increase a level of detail associated with the node or to decrease the level of detail associated with the node;
updating the active front by, for each of at least the subset of the nodes in the active front, replacing the node in the active front with its children nodes if it is determined to decrease the level of detail associated with the node, and replacing the node in the active front with its parent node if it is determined to decrease the level of detail associated with the node; and
second rendering the second CLOD representation of the 3D model by rendering the updated active front.

20. A three-dimensional (3D) model rendering system using hierarchical continuous level of detail (H-CLOD), the system comprising:
a data storage subsystem comprising:
a raw mesh store having raw 3D mesh data stored thereon, the raw 3D mesh data constructed by tessellating a 3D model to generated a plurality of polygons defined by 3D coordinate points connected by edges; and
an H-CLOD data store having an H-CLOD tree data structure comprising a plurality of hierarchically arranged nodes, each node storing a mesh representation of a portion of the raw 3D mesh data at a respective level of detail, such that the mesh representation of each child node corresponds to a sub-mesh split from a parent mesh according to a parent splitting plane, and such that the mesh representation of each parent node is a combination of the mesh representations of its children nodes simplified only in regions not touching the parent splitting plane;
a renderer comprising:
an H-CLOD input in communication with the H-CLOD data store; and
a rendered data output in communication with a rendered data store of the storage subsystem,
wherein the rendered data output comprises a first continuous level of detail (CLOD) representation of the 3D model, output by the renderer according to rendering an active front comprising a selected subset of the nodes of the H-CLOD tree data structure that combine to form the CLOD representation, the subset of the nodes selected according to a virtual camera position relative to the 3D model.

* * * * *